United States Patent
Rosenberg

(10) Patent No.: US 9,357,076 B2
(45) Date of Patent: May 31, 2016

(54) LOAD BALANCING OF DISTRIBUTED MEDIA AGENTS IN A CONFERENCE SYSTEM

(71) Applicant: Cisco Technology, Inc., San Jose, CA (US)

(72) Inventor: Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/298,014

(22) Filed: Jun. 6, 2014

(65) Prior Publication Data

US 2015/0358472 A1    Dec. 10, 2015

(51) Int. Cl.
| | |
|---|---|
| H04M 3/56 | (2006.01) |
| H04L 29/06 | (2006.01) |
| H04L 12/803 | (2013.01) |
| H04L 29/12 | (2006.01) |
| G06F 17/30 | (2006.01) |

(52) U.S. Cl.
CPC ........... *H04M 3/56* (2013.01); *G06F 17/30861* (2013.01); *H04L 47/125* (2013.01); *H04L 61/1511* (2013.01); *H04L 65/1069* (2013.01); *H04L 65/403* (2013.01); *H04L 61/2575* (2013.01)

(58) Field of Classification Search
None
See application file for complete search history.

(56) References Cited

U.S. PATENT DOCUMENTS

| | | | |
|---|---|---|---|
| 7,983,660 B2 | 7/2011 | Bao et al. | |
| 8,265,614 B2 | 9/2012 | Allen et al. | |
| 8,589,563 B2 | 11/2013 | Ethier et al. | |
| 2008/0219223 A1* | 9/2008 | Bienas | H04M 7/0072 370/338 |
| 2010/0165889 A1* | 7/2010 | Madabhushi | H04M 3/2227 370/261 |
| 2013/0196637 A1 | 8/2013 | Allen et al. | |
| 2013/0339781 A1* | 12/2013 | Wamorkar | G06F 11/20 714/4.2 |
| 2015/0058469 A1* | 2/2015 | Li | H04L 43/08 709/224 |
| 2015/0249547 A1* | 9/2015 | Layman | H04L 12/462 370/260 |

* cited by examiner

*Primary Examiner* — Faruk Hamza
*Assistant Examiner* — Cassandra Decker
(74) *Attorney, Agent, or Firm* — Edell, Shapiro & Finnan, LLC

(57) ABSTRACT

A load balancer controls a cluster of media agents each configured to perform media packet processing operations in a conference session. The load balancer receives a Session Traversal Utilities for Network Address Translation/Translator (NAT) (STUN) request from a caller to establish media. The STUN request includes a conference identifier (ID) for the session. The load balancer determines an availability of each of the media agents in the cluster, selects a media agent for the caller based on the conference ID and the determined media agent availabilities, forwards the STUN request to the selected media agent, and routes media packets between the caller and the selected agent for the session.

25 Claims, 19 Drawing Sheets

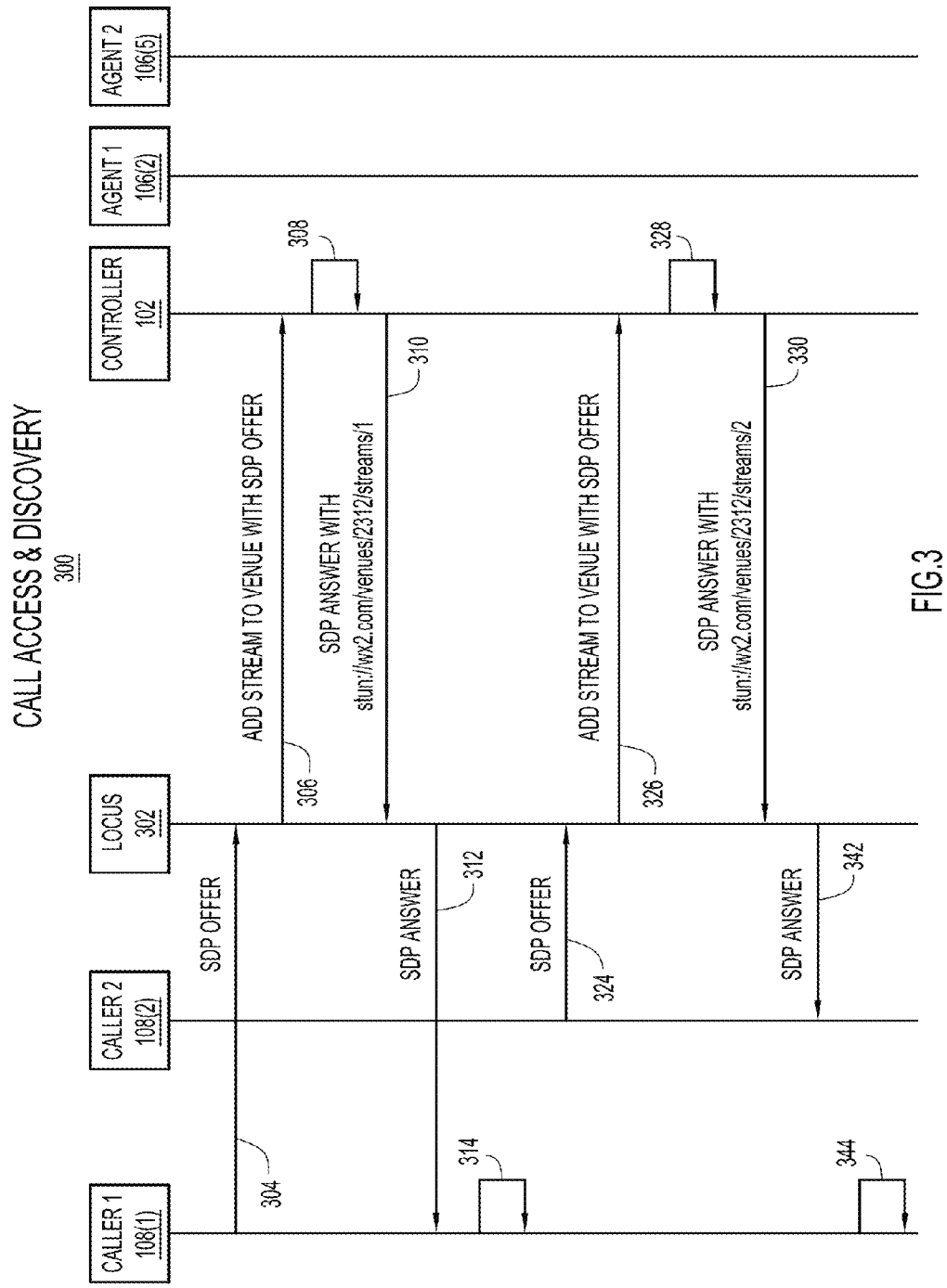

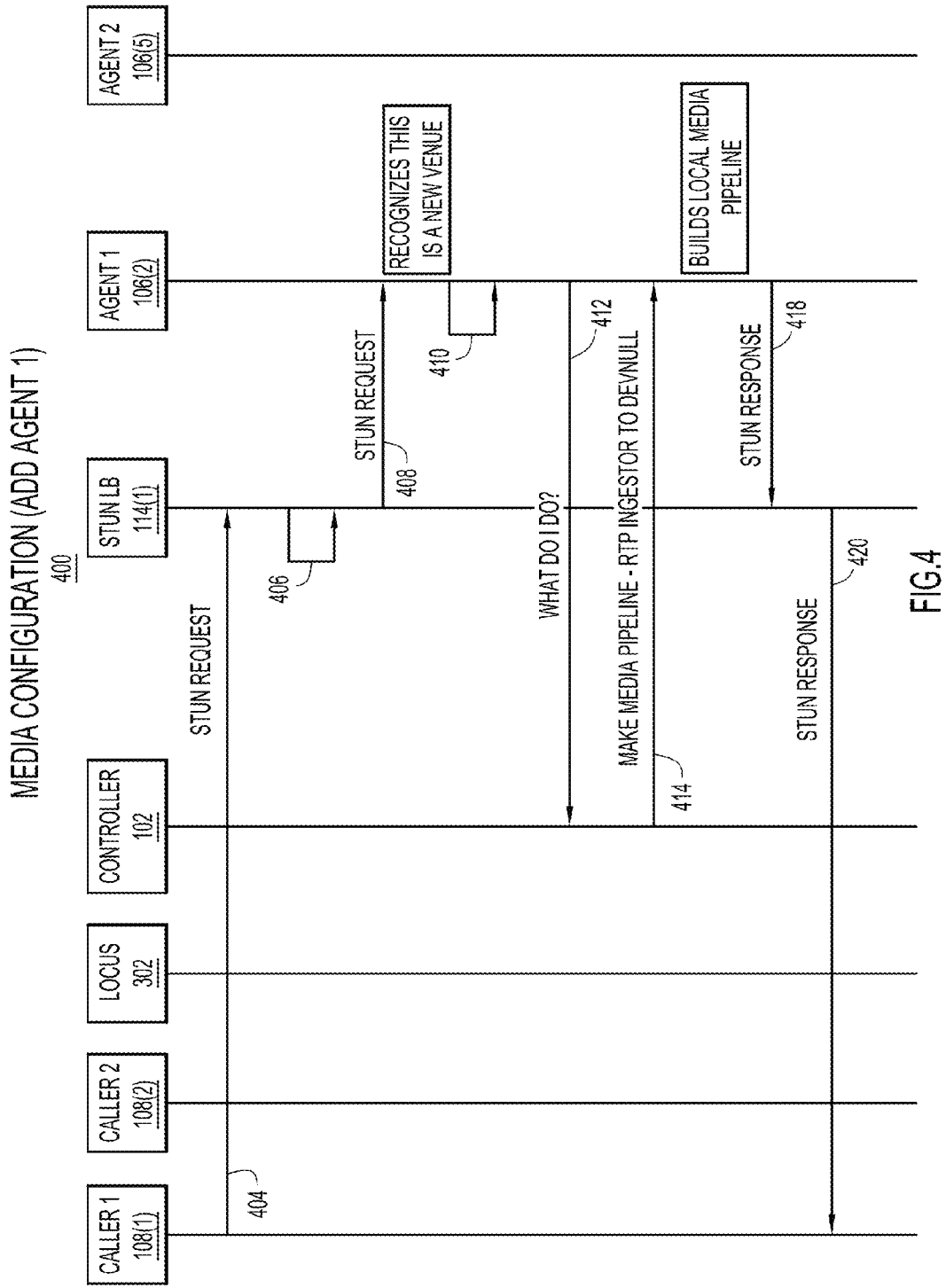

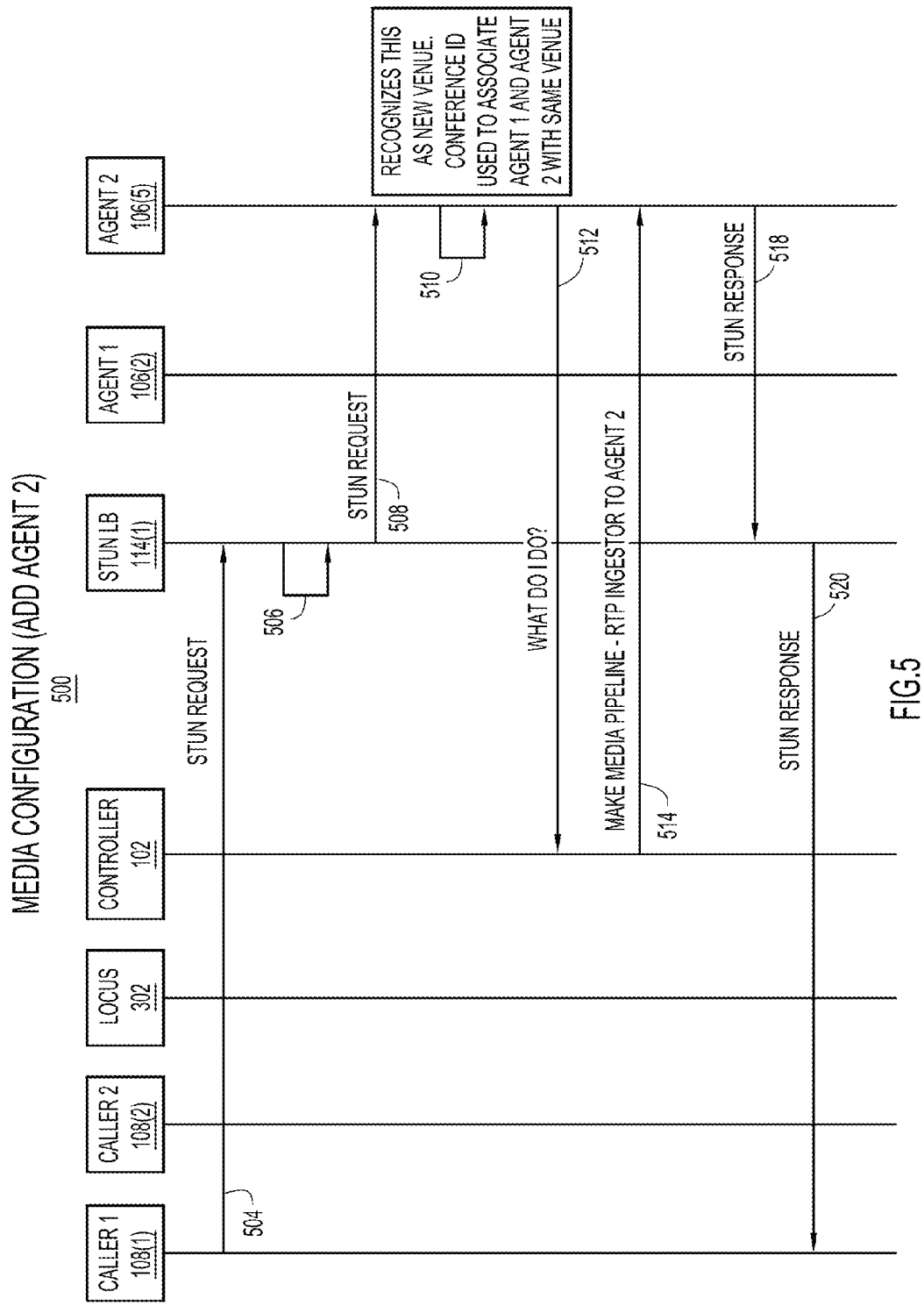

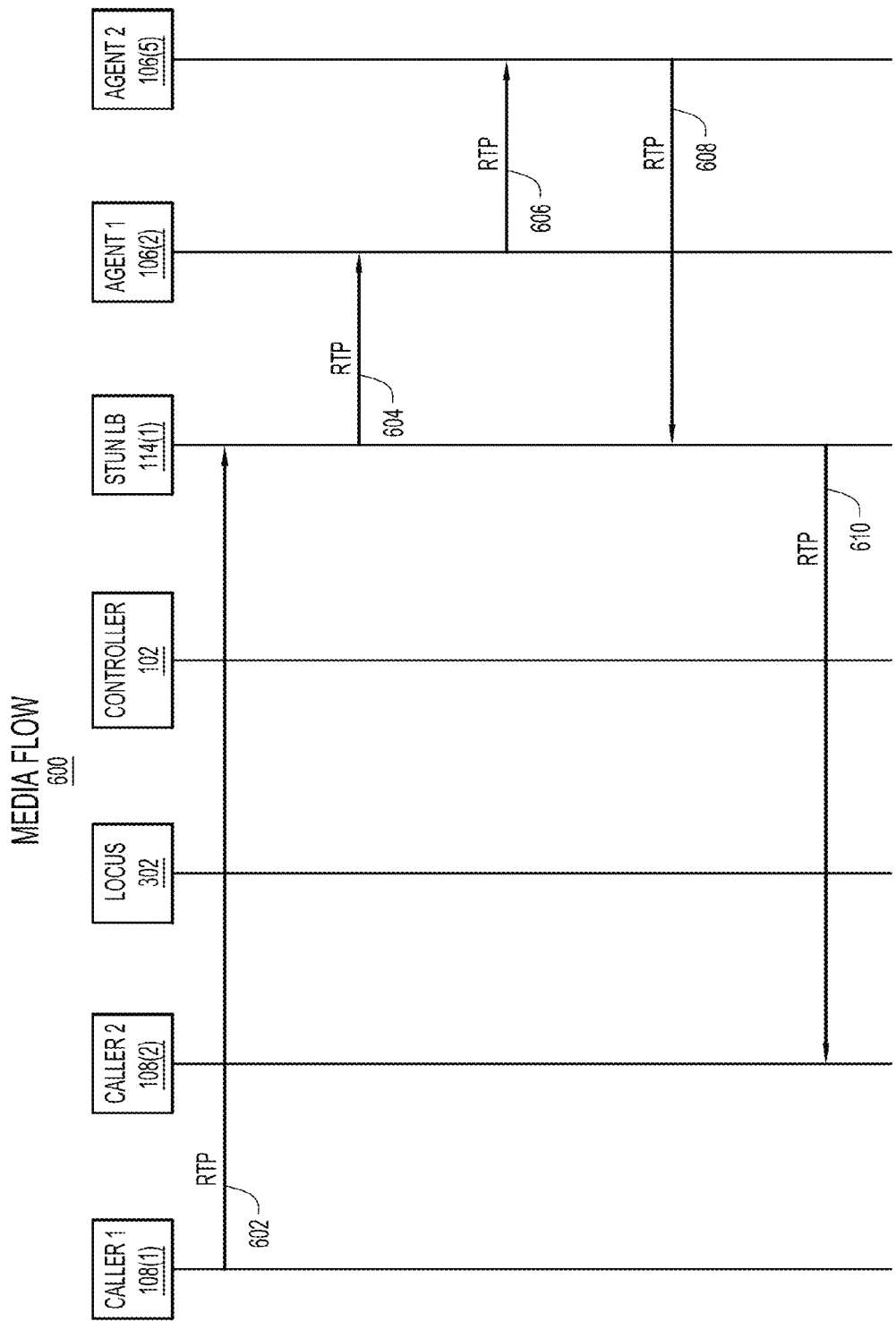

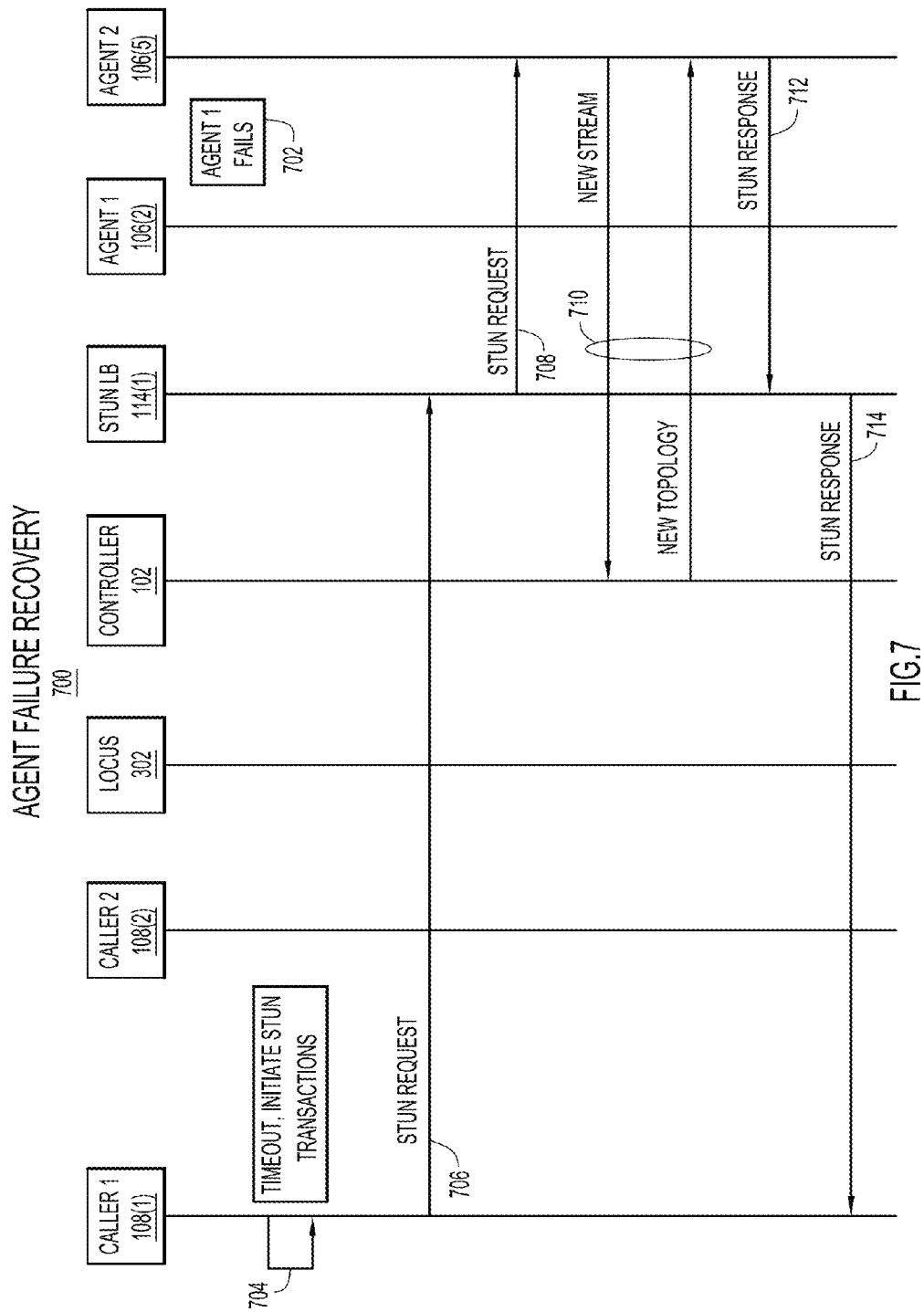

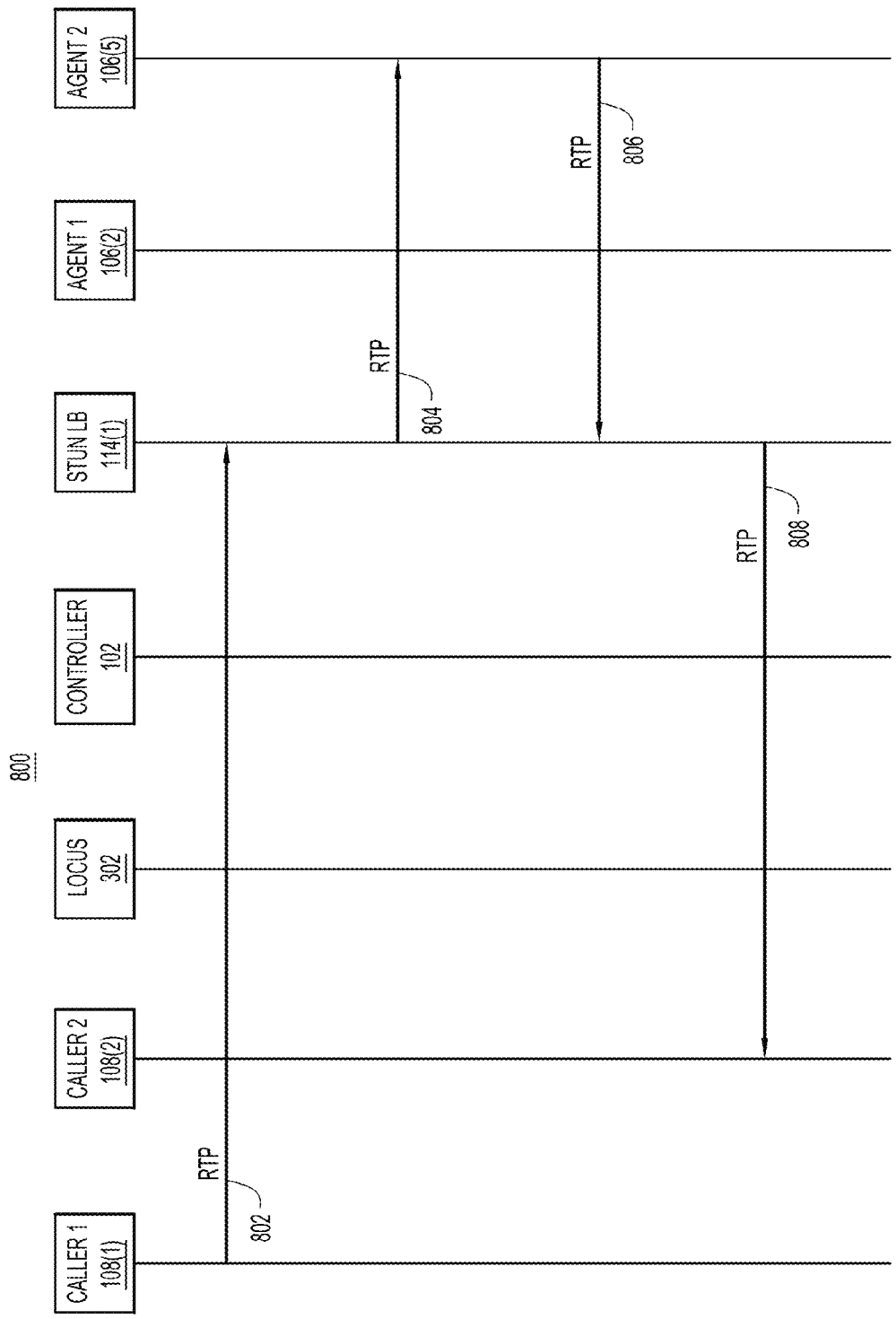

LOAD BALANCING OF DISTRIBUTED MEDIA AGENTS IN A CONFERENCE SYSTEM

TECHNICAL FIELD

The present disclosure relates to conference sessions in cloud-based conference systems.

BACKGROUND

Today, conference solutions are generally of two types. There are premise-based conferencing systems and there are cloud-based conferencing systems. Premise-based systems have the benefits of keeping media associated with a conference session on premise, allowing for enterprise Quality of Service management, reduction of wide area network bandwidth costs, low latency, and so on. However premise-based systems are more complicated to manage for certain topologies, and require relatively high up-front costs. Cloud-based conference services seamlessly enable business-to-business and business-to-consumer conferencing but can incur relatively high wide area network costs, latency penalties, and possible quality degradation.

BRIEF DESCRIPTION OF THE DRAWINGS

FIG. 3 is an example transaction diagram for establishing a conference session by accessing and discovering media agents for the conference session, according to an example embodiment.

FIGS. 4-6 are example transaction diagrams directed to configuring the discovered media agents into a media topology to support media packet flow.

FIGS. 7 and 8 are example transaction diagrams directed to failure recovery in the conference session.

DESCRIPTION OF EXAMPLE EMBODIMENTS

Overview

Techniques are presented herein for load balancing across media agents in a conference session. A load balancer controls a cluster of media agents each configured to perform media packet processing operations in a conference session. The load balancer receives a Session Traversal Utilities for Network Address Translation/Translator (NAT) (STUN) request from a caller to establish media. The STUN request includes a conference identifier (ID) for the session. The load balancer determines an availability of each of the media agents in the cluster, selects a media agent for the caller based on the conference ID and the determined media agent availabilities, forwards the STUN request to the selected media agent, and routes media packets between the caller and the selected agent for the session.

Example Embodiments

Cloud-based Conference System

Figure 1:
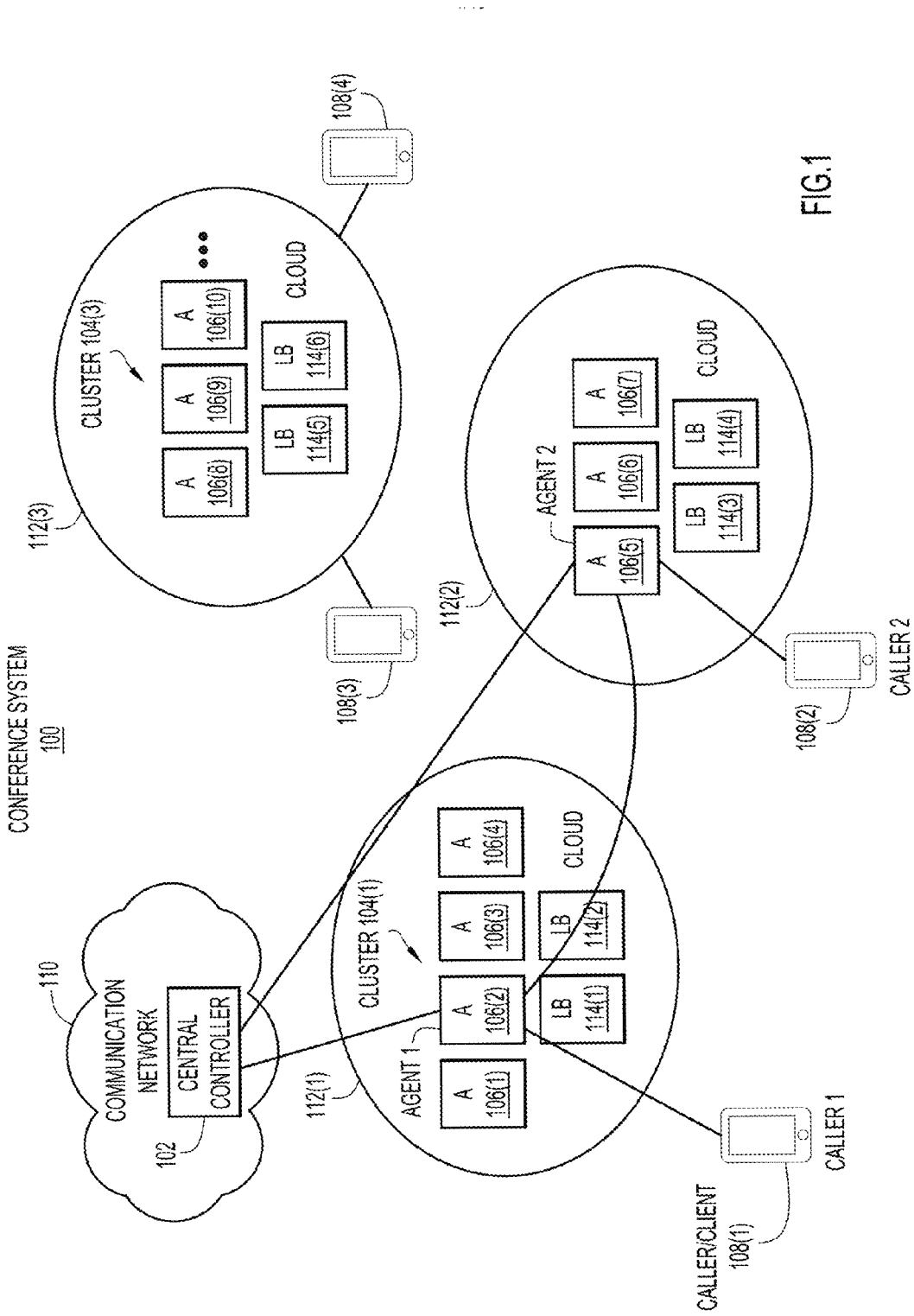
FIG. 1 is an illustration of a highly-distributed cloud-based conference system in which techniques presented herein for conference session access, media agent discovery, and configuration of a media topology may be implemented, according to an example embodiment.

Referring to FIG. 1, there is an illustration of a highly-distributed cloud-based conference system 100 in which techniques presented herein may be implemented. This system can be referred to as a hybrid system that provides a mix of cloud-based features and on-premise based features which the short-comings of either solution in isolation. Conference system 100 includes a central controller 102 located in a "cloud" and configured to perform overall control of the system 100. Conference system 100 includes multiple geographically distributed groups or clusters 104(1)-104(n) of media agents (A) 106(1)-106(k) configured to operate under control of the controller 102. For example, cluster 104(1) includes media agents 106(1), 106(2), 106(3) and 106(4), cluster 104(2) includes media agents 106(5)-106(7), cluster 104(3) includes media agents 106(8)-106(k), and so on.

Multiple callers/clients 108(1)-108(n) access and participate in conference sessions (also referred to as "conference calls") through media agents under control of the controller 102. The example of FIG. 1 shows two callers, "caller1" at 108(1) and "caller2" at 108(2) engaged in a conference session through two associated media agents "agent1" at 106(1) and "agent2" at 106(5) in clusters 104(1) and 104(2), respectively. In the ensuing description, media agents A are referred to collectively as "media agents 106" depending on the context. Similarly, callers/clients 108(1)-108(n) may be referred to collectively as "callers 108," and agent clusters 104(1)-104(n) may be referred collectively as "clusters 104."

The controller 102 resides in a "cloud" or data center 110. To control system 100, the controller 102 performs control plane signal operations/functions using such features/functions afforded the Session Initiation Protocol (SIP), H323 access, rosters, and conference control operations (including, e.g., mute, kick, etc.). The controller 102 also performs orchestration—which means it is responsible for controlling the connections between media agents in different clusters to ensure that a particular conference is fully connected and provides the necessary audio and video processing functions. Clusters 104 of media agents 106 each reside in a respective cloud or data center shown at reference numerals 112(1)-112(n), which may include enterprise networks, branch networks and offices, carrier access networks, public clouds, and so on. It is desirable for users to connect to media agents which are topologically and physically near them, and for users in the same location, for the same conference, to be connected to the same media agent. Media agents 106 perform media (e.g., audio and video) packet processing operations in support of conference sessions in which callers 108 participate, such as, but not limited to, media packet mixing, switching, encoding, decoding, and transcoding. One or more load balancing (LB) servers 114 (also referred to simply as "load balancer(s) 114"), co-located and associated with each cluster 104, perform local control and selection of media agents 106 in that cluster. For example, there are load balancers (LBs) 114(1) and 114(2) associated with cluster 104(1), LBs 114(3) and 114(4) associated with cluster 104(2) and LBs 114(5) and 114(6) associated with cluster 104(3). In addition, the load balancer function can be integrated into the media agent so that it does not exist as a distinct physical component.

A conference session may involve the exchange of one or more of audio and video between any number of participants (callers) as well as the sharing of content by one participant with one or more other participants. Such shared content may include documents, presentations, audio content, video content, etc.

As will be described in detail below, techniques presented herein dynamically configure highly-distributed resources in conference system 100, including controller 102, media agents 106, and load balancers 114, to support conference sessions initiated by callers 108 on an as needed basis. In support of these techniques, controller 102, media agents 106, callers 108 and load balancers 114, implement and interact with each other using a variety of communication protocols to establish conference sessions and exchange media streams/packets in the conference sessions. Such communication protocols include, but are not limited to: the Interactive Connectivity Establishment (ICE) protocol; the Session Traversal Utilities for Network Address Translation/Translator (NAT) (STUN) protocol modified/extended to use STUN URLs, in accordance with techniques presented herein; the User Datagram Protocol (UDP); and the Real-Time Transport Protocol (RTP). The techniques described herein use the aforementioned protocols by way of example, only; other similar protocols may also be used instead of or in combination with the mentioned protocols, as would be appreciated by one of ordinary skill in the relevant arts having access to the description presented herein.

Distributed media agents 106 may number in the tens of thousands and be distributed geographically around the world. Similarly, callers 108 may be located anywhere in the world. Thus, conference system 100 is referred to as "highly distributed." A challenge presented by such a distributed arrangement is to construct a "best" media topology in which callers 108 are assigned to topologically nearest media agents 106 in support of media exchange between callers in conference sessions. In one conventional technique, the conference controller attempts to track relative locations of media agents and callers and uses control-plane signaling to direct the callers to nearest agents; however, this does not scale upwardly to highly distributed systems because the controller cannot always determine the best/nearest media agents due to outdated agent location databases and deficiencies in control plane signaling that can lead to ambiguities. Moreover, media agents are prone to failure and, often, the conference controller may not become aware of such failure in a timely manner (or at all) given the network separation between the controller and the agent and inherent delays in control plane signaling caused by that separation. In addition, it becomes challenging to centrally track and manage the available capacity for such a larger number of media agents. Finally, network based techniques for discovery of localized media agents—including anycast—cannot be done utilizing a central controller.

Accordingly, techniques presented herein address the challenge of assigning "best" media agents to callers in highly distributed conference system 100 and rapidly recovering from failures. An example of a "best" media agent for a given caller is a media agent that is (i) available (i.e., operationally capable of performing media agent operations), (ii) topologically nearest to the caller compared to other media agents, and (iii) has available compute, networking and memory capacity to handle the conferences. The techniques delegate the process of discovering best media agents away from conference controller 102 to media-plane signaling and discovery, combined with late binding configuration of media topologies (i.e., arranging the best media agents for media exchange between the callers). At a high level, the techniques establish or setup a conference session in two stages. A first stage, call access and discovery, uses call access signaling primarily between conference controller 102 and callers 108 that wish to access the conference session. During the call access and discovery stage, controller 102 provides information to callers 108 to enable the callers to discover addresses of nearest available agents 106 to support conference sessions, which advantageously relieves the controller 102 of this task. In a second stage, the controller 102 configures media agents 106 discovered by callers 108 in the first stage into a media topology. Callers 108 then exchange media packets in the conference session over the so-configured media topology.

High-level transactions for establishing a conference session are now described. Each of multiple callers 108 initially contact conference controller 102 to access the conference session and in response, the controller sends a URL for the conference session to each of the callers. The URL includes a conference identifier (ID) and information from which nearest media agents 106 are discoverable. Alternatively, instead of using a URL, the conference ID and media agent discovery information can be provided to the clients directly. Using the information in the URL, each of callers 108 discovers a respective Internet Protocol (IP) address corresponding to a nearest media agent 106. Each caller 108 sends a conference join request including the URL to a respective one of the nearest media agents 106 (perhaps through a load balancer 114) via the discovered IP address. Each media agent 106 receives the respective join request, discovers an IP address for controller 102 from the URL in the join request, and then queries the controller to ask for further information about the conference. Controller 102 associates the media agents 106 that sent join requests having the same conference ID with each other and with the conference session, and configures the associated media agents into the appropriate set of cascades over which the callers exchange media packets in the conference session. In embodiments in which the IP addresses discovered by callers 108 corresponds to one or more load balancers 114 each configured to control a respective cluster 104 of local media agents 106, callers 108 send the respective join requests to the discovered load balancer(s). Each load balancer 114 selects an available agent 106 from the local agent cluster 104, forwards the join requests to the selected media agent, and then the selected media agent forwards the join request to controller 102 after discovering the controller, as mentioned above.

In an alternative embodiment, the load balancer functionality can be absorbed into the media agent. When the load balancer receives the join request, it interrogates a shared database amongst the load balancers, and determines which if any media agent is already servicing the conference. If there is already one assigned, the load balancer redirects the client to that media agent. If not, the load balancer redirects the client to a media agent in the cluster with available capacity.

Before describing the above-mentioned high-level transactions in detail, the following definitions are provided for various components and protocols mentioned above.

Media Agent: A media agent (e.g., any of the media agents 106(1)-106(k)) performs media processing functions under control of conference controller 102, such as switching, mixing, transcoding, presentation layout arranging, and the like. A media agent is configured to form a pipeline which defines a set of internal media processing functions that are applied. These include buffering, decoding, mixing, switching, energy level computation, and so on. The media agent can also be configured to form a cascade. A cascade is a connection between two media agents which carries media between them in order to extend a conference across multiple media agents. Conference controller 102 instructs each media agent as to how to assemble the media pipeline and to which other media agents it should form cascades. Media agents may communicate with other local media agents in the same cluster over an inter-media agent message bus.

Conference controller: Conference controller 102 provides overall control of initializing and configuring resources, such as media agents 106, to support a conference session. A conference session is also referred to herein as a "venue." Conference controller 102 exposes Internet/web Application Programming Interfaces (APIs) to callers 108 and media agents 106, which permit remote applications to request creation and manipulation of venues. The venue is a related set of conference media streams which are logically connected together with a media pipeline and cascades, i.e., media packets associated with each of the media streams are mixed together and routed through the pipeline by the media agents connected with the pipeline. Conference controller 102 determines the composition of the media pipeline and cascades across media agents which will support the venue. For any particular conference or venue, there is a single conference controller instance in charge (though there may be replication of the data to other instances for purpose of high availability).

STUN: (Session Traversal Utilities for NAT) is a standardized set of methods and a network protocol to enable an endpoint host to discover an associated public IP address of the host if the host is located behind a Network Address Translation/Translator (NAT). STUN permits NAT traversal for applications of real-time media, including voice, video, messaging, and other interactive IP communications. STUN is intended as a tool used in other protocols, such as Interactive Connectivity Establishment (ICE). STUN is documented in RFCs 5389 and 7046.

ICE: ICE is a technique used in computer networking involving NATs in Internet applications of Voice-over-IP (VoIP), peer-to-peer communications, video, instant messaging and other interactive media. ICE is published in RFC 5245.

STUN LB: Callers 108 that comply with the ICE standard perform STUN transactions (called connectivity checks) during and before transmission of Real-Time Transport Protocol (RTP) (media) flows. These STUN transactions serve as identification of media streams. The STUN LB (e.g., load balancer 114) interacts with callers 108 in the STUN transactions (and in the RTP flows which follow) and direct them to available media agents associated with the callers.

Generalized Device Controller

Figure 2:
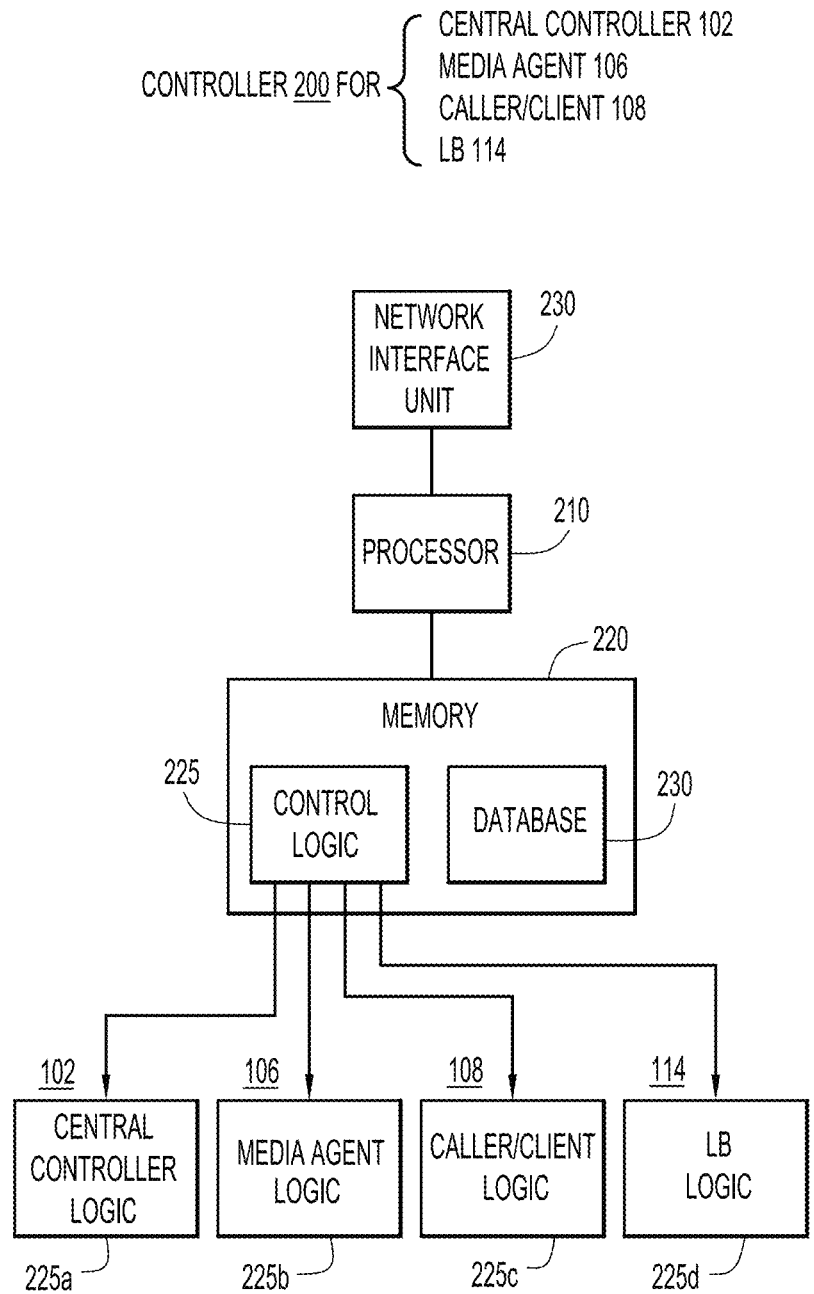
FIG. 2 is a block diagram of an example generalized controller that may be used in any of a central conference controller, a media agent, a load balancer, and a caller/client of the conference system.

With reference to FIG. 2, there is depicted a block diagram of an example generalized controller 200 for any of conference controller 102, media agent 106, load balancer 114, and caller 108. Conference controller 102, media agent 106, and load balancer 114 may each comprise one or more computer servers controlled by an instance of generalized controller 200. Caller 108 may be a client device such as, but not limited to, a Smartphone, a tablet, a laptop/personal computer, and the like, controlled by an instance of generalized controller 200.

Generalized controller 200 includes a processor 210 that processes instructions to perform operations for a respective one of conference controller 102, media agent 106, load balancer 114, and client 108; and a memory 220 to store a variety of data and software instructions for execution by the processor 210. Generalized controller 200 also includes a network interface unit (e.g., network interface card or multiple network interface cards) 230 that enables network communications so that the generalized controller can communicate with other devices, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., control logic/software 225) comprising computer executable instructions and when the software is executed (by the processor 210) it is operable to perform the operations described herein. In addition, memory 220 incudes a data store or database 230 to store data used and generated by logic 225. Instances of memory 220 residing in conference controller 102, media agent 106, caller 108, and load balancer 114, respectively includes, conference controller logic 225a, media agent logic 225b, caller logic 225c, and load balancer logic 225d, to perform the operations for the respective device as described below.

Conference Session Setup

Turning to FIGS. 3-6, there will now be described a series of example transaction diagrams that depict message transactions between and operations performed by the various components in system 100 (e.g., callers 108, media agents 106, conference controller 102, load balancers 114, and so on) that are used to establish or setup a conference session. The examples of FIGS. 3-6 establish a conference session for caller1 and caller2 at reference numerals 108(1) and 108(2), depicted in FIG. 1. In the example of FIG. 1, caller1 and caller2 connect with media agent1 106(2) and media agent2 106(5) in clusters 104(1) and 104(2), respectively. In other arrangements, the media agents serving this conference session may reside in the same cluster. Also, both caller1 and caller2 (and other callers) may all connect with the same media agent, i.e., a single media agent handles all of the callers in a given conference session. In the ensuing description, a "media agent" is also referred to simply as an "agent."

Initial Call Access and Agent Discovery

With reference to FIG. 3, there is depicted an example transaction diagram 300 for the first stage in establishing the conference session, i.e., initially accessing and discovering agents for the conference session.

Transactions 304, 306, 310, and 312 (described below) through which caller1 contacts conference controller 102 to initiate access to the conference session may rely on signaling protocols/messages, such as, but not limited to, SIP, H.232, Representational State Transfer (REST)-based APIs, and the like.

At 304, caller1 sends an access request in the form of an SDP offer to a locus 302. Locus 302 represents a call agent or call manager that facilitates conference call setup, and may offer REST-based APIs to join a conference session. The SDP offer includes one or more caller1 identifiers (IDs). Locus 302 recognizes the SDP offer from caller1 as a conference call access request.

At 306, locus 302 sends a request to the controller to request creation of a new venue, and to furthermore add the first media stream to this venue, as defined by the SDP offer. The terms "conference" and "venue" as used herein are synonymous and interchangeable.

Controller 102 receives the request from locus 302. Controller 102 assigns a unique conference ID for the conference session that is about to be established for the first stream. Controller 102 begins tracking various ones of streams from callers 108 and agents 106 that are/will be associated with the conference session (i.e., with the assigned conference ID, as will be described more fully below).

Controller 102 uses the caller1 IDs to retrieve pre-provisioned information, including, e.g., domain names and/or IP addresses, through which candidate media agents associated with the caller1 IDs may be discovered. The pre-provisioned information may be stored in an agent/agent cluster identifier database (see, e.g., database 1300 in FIG. 13, described below). Controller 102 constructs a STUN URL for the conference session based on the retrieved information. The STUN URL includes the new conference ID and the retrieved domain names and/or IP addresses. An example of a process by which controller 102 constructs the STUN URL based on the agent/agent cluster identifier database is described below in connection with FIG. 13. The STUN URL includes information/designators (e.g., the domain names) that will be used by caller1 to discover a best one of media agents 106 to which caller1 can connect in the conference session. Thus, the STUN URL enables controller 102 to delegate agent discovery to caller1. In essence, the STUN URL provides a layer of indirection that allows caller1 to discover the best media agent. The indirection is result of the fact that the STUN URL does not provide an IP address that points directly to the best media agent, rather, the STUN URL is used by the caller as a basis for discovery of such an IP address. Of course, simplified versions are possible where the controller does provide an IP address of one or more media agents in the cluster that the client should connect to.

In the example of FIG. 3, the STUN URL is "stun://wx2.com/venues/2312/streams/1." The STUN URL includes a URL type designator (e.g., "stun"), a domain name (e.g., "wbx2.com"), a unique conference/venue identifier (e.g., "2312"), and an associated media stream source identifier (e.g., "1" for caller1). Another example STUN URL is "stun://media.wbx2.com/conf283711," in which the conference ID is "283711." Other forms of the STUN URL are possible.

At 310, controller 102 sends an SDP answer including the STUN URL to locus 302. The STUN URL may replace the IP address and port that would have otherwise been placed into the SDP answer. Alternative encodings of the STUN URL are possible. More generally, the SDP answer includes the unique conference ID and media agent discovery information that includes any information the caller will need/use to discover an appropriate (e.g., nearest) media agent with which to connect, as described below. The URL format for this information is only one of many different formats that may be used.

At 312, locus 302 forwards the SDP answer with the STUN URL to caller1.

Caller1 receives the SDP answer with the STUN URL. In response, at 314, caller1 discovers the best agent based on the STUN URL. STUN URL discovery techniques and example scenarios are described in detail below in connection with FIGS. 9-12, but are summarized here. Any discovery technique may be used by caller1 to resolve the STUN URL to an IP address of the nearest available agent(s) 106. For example, Domain Name System (DNS) discovery based on the STUN URL may be used. Geo-DNS and split horizon DNS resolve the URL to an IP address of an agent cluster 104 in a domain that is geographically local to caller1. For example, DNS discovery based on a domain name may return to the caller an anycast IP address shared by multiple media agents in a local branch office so that caller1 may be connected to the nearest agent in the local branch office. Another form of discovery that may be used is a service advertisement framework (SAF), for example. Alternatively the STUN URL may encode an anycast address directly. Or, it may be the DNS name that resolves to one or more media agents in a specific cluster that the client should connect to.

Often, the discovered IP address may be that of a load balancer in an agent cluster; if this is the case, the load balancer will select an available agent for caller1 among the agents in the cluster that is local to that load balancer.

In the above described transactions, the usage of STUN, including the STUN URL, can be considered part of the ICE protocol used to establish the conference call.

Next, transactions 324-344 mirror transactions 304-314, except that transactions 324-344 relate to caller2. In transaction 324-344, caller2 requests access to the same venue as caller1, and receives an SDP offer from controller 102 that includes a STUN URL that identifies that venue (i.e., includes the same conference ID as the STUN URL sent from controller 102 to caller1 at 310). In the example of FIG. 3, the STUN URL sent from controller 102 to caller2 at 330 identifies the same domain name identified in the STUN URL sent from the controller to caller1 at 310 (e.g., wx2.com), but this is not necessarily the case.

At the conclusion of the transactions shown in FIG. 3, caller1 and caller2 have used discovery techniques to resolve respective STUN URLs received from controller 102 to IP addresses for respective first and second load balancers (or for individual agents in cases where no load balancer exists).

The discovered IP addresses are used in the second stage of conference session setup, which includes configuring discovered agents into a media topology connected with caller1 and caller2 to support media exchange between the callers, as is now described in connection with FIGS. 4-6.

Join Request (STUN) and Media Topology Configuration

With reference to FIG. 4, there is depicted a series of transactions 400 performed in the second stage to configure agent1 in relation to caller1.

At 404, caller1 sends a join request to join the conference session. In the example of FIG. 4, the join request is sent in the form of a STUN request to load balancer 114 based on the IP address discovered for that load balancer from the STUN URL during the transactions 300 shown in FIG. 3. The STUN request includes attributes related to caller1, including an IP address of, and identity credentials for, caller1. The STUN request also includes the STUN URL sent to caller1 at 310. The inclusion of the STUN URL in the STUN request is an extension of the standard STUN protocol. In an example, caller1 discovered the IP address for, and sends the STUN request to, load balancer 114(1) in cluster 104(1). Alternatively, the STUN URL can be conveyed separately to the media agent, outside of the STUN protocol, using media plane data channels. The STUN request is sent as part of connectivity checks mandated by the ICE protocol (RFC 5245).

In FIG. 4 and subsequent figures, load balancer 114(1) may be referred to as a "STUN load balancer" (or "STUN LB") because the load balancer operates in accordance with the STUN protocol, extended to include the STUN URL in accordance with the techniques described herein. In essence, STUN load balancer 114(1) acts like a Hypertext Transfer Protocol (HTTP) reverse proxy, but for media traffic, and uses STUN as signaling to convey session parameters related to establishing the conference session. In other embodiments, load balancer 114(1) may operate in accordance with other protocols that do not include STUN or that may be combined with STUN.

Load balancer 114(1) receives the STUN request from caller1. In response, at 406, load balancer 114(1) selects an available agent for caller1 from the local cluster 104(1) of agents that operates under the control of that load balancer. Load balancer 114(1) makes the selection based on factors evaluated across all of the agents in the cluster, such as agent availability (up/down status), agent computational loading/processing bandwidth, and so on. Load balancer selection operations are described more fully below in connection with FIGS. 14 and 15. In the example of FIG. 4, load balancer 114(1) selects agent1 106(2).

At 408, load balancer 114 forwards the STUN request from caller1 to the selected agent (e.g., agent1) 106(2). In alternative embodiments, load balancer 114 may redirect the client to connect to the selected agent. For example, the load balancer functionality may be incorporate into a media agent, in which case, when the (discovered) media agent receives the join request (e.g., STUN request), the media agent determines the conference session from the conference ID in the request, identifies a media agent that is best suited to handle the conference session, and redirects the caller to connect to the best suited media agent. In this example, to identify the media agent that is best suited, the media agent that received the join request determines whether the conference session is already being handled by a media agent in the cluster. If it is, then that agent already handling the conference session is the one best suited to handle the conference session. If it is not, the media agent identifies an available agent based on capacity, with the identified agent being the one best suited to handle the conference session.

The selected agent (e.g., agent1) receives the STUN request. In response, at 410, the agent connects to the controller, i.e., forms a connection with the controller. In one embodiment, the agent is configured with a static domain name for the farm of controllers, and the conference ID is included in the HTTP request towards this farm. Using common web service design techniques, any server in the farm can process the request, and it will utilize the conference ID information included in the request to fetch the state for the conference from a backend database. In an alternative embodiment, the STUN URL can include additional information which identifies—by DNS name or IP address—the specific controller instance handling this conference.

At 412, agent1 sends an action/instruction request including the STUN URL to controller 102 (discovered at 410). The action/instruction request is a request for instructions from controller 102 on what next action agent1 is to take with respect to the STUN request for the venue indicated in the STUN URL.

Controller 102 receives the action request from agent1. Controller 102 recognizes the conference ID in the STUN URL and that caller1, caller2, and now agent1 are associated with that conference ID. In response to such an action request, generally controller 102 commands the agent to perform specific functions associated with the conference session (such as switching, media mixing, transcoding, layout arranging, etc.) and provides IP addresses of other agents to which the agent should connect to form a dynamic cascade of agents (i.e., the controller configures the media agents into a media topology connected with the callers). As such, controller 102 configures the media topology as a cascade as callers 108 connect to their respective agents, one caller at a time.

Continuing with transactions 400 in the example of FIG. 4, in response to the action request from agent1, at 414, controller 102 sends a "make pipeline" instruction to agent1 to cause agent1 to setup a media pipeline (over which media packets can flow to and from caller1. Because a second/peer agent for caller2 has not yet been identified to controller 102 for this venue, the "make pipeline" instruction to agent1 uses an "RTP ingester to devnull" command to direct agent1 to accept/ingest media packets from caller1, but discard ("devnull") the media packets. In this example, it is assumed that media packet flow will be in accordance with RTP; however, other media transaction protocols may be used.

More generally, transactions 412 and 414 represent communication or interaction between the media agent and the controller by which the discovered media agent requests configuration information, and obtains the media configuration information, from the controller that the media agent then uses to form or set up a media connection over which the caller can exchange media packets. In other words, in transactions 412 and 414, responsive to the requests from the discovered media agent, the controller provides the necessary media configuration information to the media agent.

At 418, agent1 sends to load balancer 114(1) a STUN response indicating the agent 106(2) has completed STUN actions initiated responsive to the STUN request sent at 408.

At 420, load balancer 114 forwards the STUN response to caller1. The STUN request from transaction 404 is essentially a peer-to-peer connectivity check that verifies the address of load balancer 114(1)/agent1 106(2). As a result, the STUN response may return to caller1 a peer reflexive address of the load balancer/agent.

With reference to FIG. 5, there is depicted a series of transactions 500 performed in the second stage to configure agent2 106(5) in relation to caller2 108(2).

Transactions 504-512 mirror transactions 404-412 discussed above, except that transactions 504-512 relate to caller2 and result in selection of agent2 as the nearest available agent for caller2. The STUN request forwarded from agent2 to controller 102 at 508 carries the same conference ID as the STUN request forwarded from caller1 to the controller at 408 in FIG. 4. Controller 102 associates agent1 and agent2 with the (same) conference session based on the conference IDs in the forwarded STUN requests. The unique conference ID in the STUN URL is an end-to-end unifying ID in system 100, because the conference ID was initially sent from controller 102 to each caller, and from each caller to the STUN load balancer 114(1), respective agent, and controller 102, in turn. This enables controller 102 to delegate discovery of agents to the caller, yet learn the discovered agents later in the conference setup.

In one example, agent1 and agent2 are in the same cluster and access to the agents is provided by a common load balancer for that cluster. In another example, agent1 and agent2 are in different clusters and access to each agent is provided through a different load balancer (one for each of the different clusters). In another example, a single agent may be used, i.e., agent1 and agent2 are collapsed to one agent. Thus, load balancer 114(1) in FIGS. 4 and 5 may represent one common load balancer or, alternatively, two different load balancers.

At 514, controller 102 sends an instruction to agent2 directing agent2 to ingest media packets from caller2 and form a media cascade (i.e., media connection) with agent1 over which media packets may be exchanged between caller1 and caller2.

At 516, controller 102 sends an instruction to agent1 directing agent1 to form/finalize the media cascade (initiated at 414) with agent2. As a result, agent1 and agent2 form the media cascade over which caller1 (connected with agent1) and caller2 (connected with agent2) can exchange media packets. Agent1 and agent2 mix and transcode the media packets flowing between the callers as necessary. In this simple use case since there are only two callers, the agents simply forward the media packets.

At 518, agent2 sends a STUN response to load balancer 114(1).

At 520, load balancer 114(1) forwards the STUN response to caller2.

After transactions 400 and 500 are completed, media packets can flow between caller1 and caller2 in the conference session, as depicted in FIG. 6.

With reference to FIG. 6, there is depicted a transaction diagram 600 in which media packets are exchanged between caller1 and caller2 in the conference session using the media topology (connection/pipeline/pathway) established by transactions 300-500 depicted in FIGS. 3-5. Transactions 602-610 represent media flow from caller1 to caller2 in the order: caller1; load balancer 114(1); agent1; agent2; load balancer 114(1); and caller1. Media packets may flow in the reverse direction as well.

Media Agent Failure Recovery

With reference to FIG. 7, there is depicted a transaction diagram 700 for agent failure recovery in the conference session established in FIGS. 3-6.

At 702, agent1 fails. For example, agent1 stops sending media packets from caller2 to caller1.

At 704, caller1 detects the absence of media packets from agent1 for, e.g., 1 second, as a failure and, in response, initiates STUN transactions.

At 706, caller1 sends a second STUN request to load balancer 114(1).

At 708, load balancer 114(1) (aware that agent1 has failed) selects another available agent (not agent1) in the local cluster and forwards the STUN request to that agent, e.g., to agent2.

At 710, agent2 proceeds as if accessing a new call. Thus, agent2 and controller 102 exchange media configuration messages similar to those for a new conference as discussed above at 412, 414, 512, 514, and 516. The configuration messages terminate with STUN responses 712 and 714. These STUN transactions in the media plane (not the control plane) trigger the readjustment of the media plane topology to include agent2 as the new media agent for caller1 in place of failed agent1. Traditional conferencing systems in this situation would require the caller to re-establish the call, including call signaling, SDP offer/answer exchanges, media negotiation, and discovery, which are slow. In this invention, the reconnection occurs only at the media plane layer (using STUN or similar functionality) which is faster.

As a result of failure recovery transactions 700, media packets flow as depicted in FIG. 8.

With reference to FIG. 8, there is depicted a transaction diagram 800 of packet flow after the failure recovery implemented through transactions 700. Transactions 802-808 represent media flow from caller1 to caller2 in the order: caller1; load balancer 114; agent2; load balancer 114; and caller2.

Agent Discovery Using STUN URLs

The STUN URL discovery techniques mentioned above are now described in detail with reference to example scenarios illustrated in FIGS. 9A-9C, 10, 11, and 12A-12C.

Figure 9A:
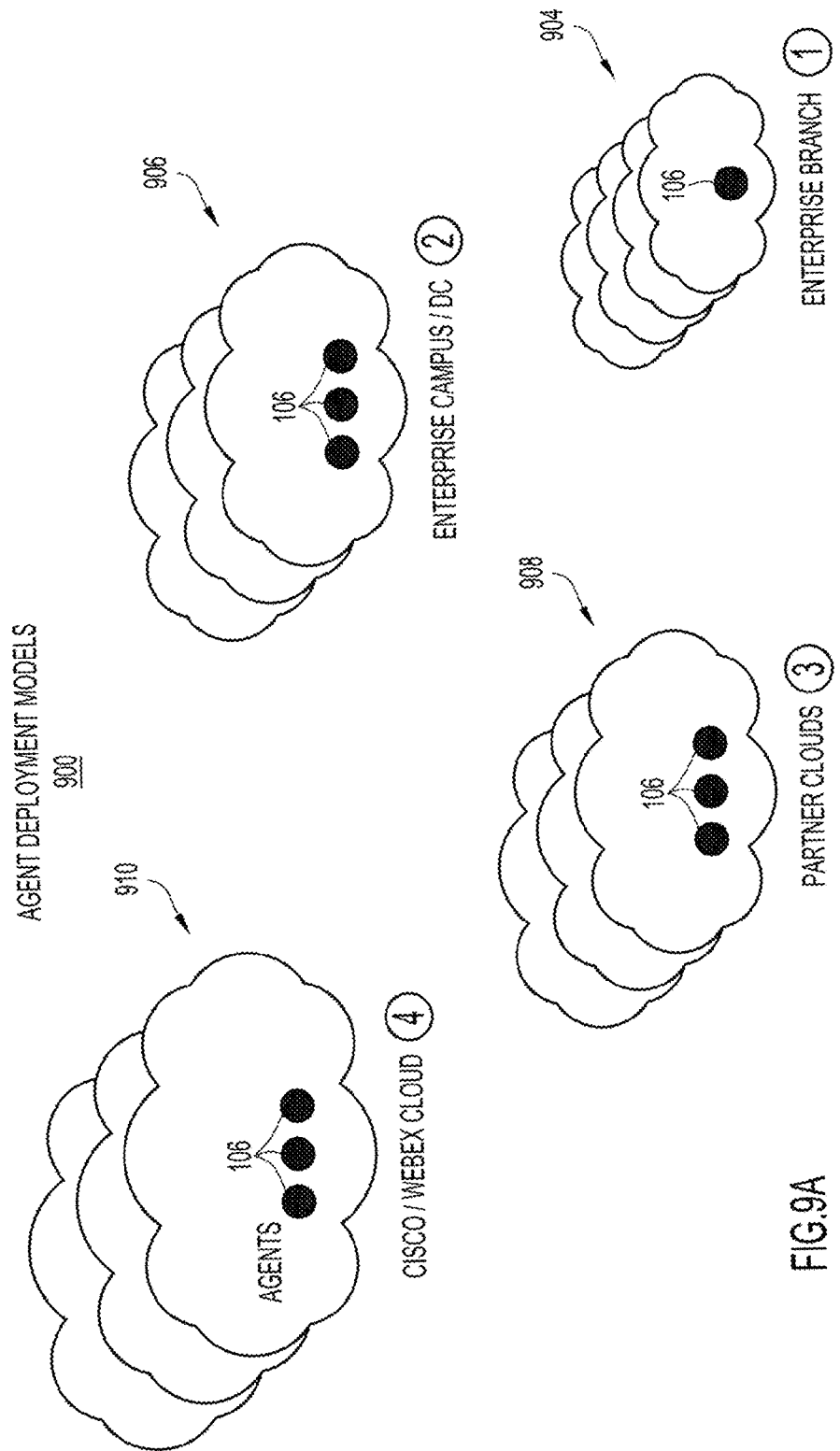
FIG. 9A is an example agent deployment model in which agents are deployed across various networks/clouds, according to an example embodiment.

With reference to FIG. 9A, there is depicted an example agent deployment model 900 in which agents 106 are deployed across various clouds. Model 900 includes an enterprise branch 904 that hosts only one agent 106. Additional agents are distributed in clusters across an enterprise campus 906, partner clouds 908, and a Cisco WebEx cloud 910. Clouds 904-910 in FIG. 9A may correspond to networks 112 depicted in FIG. 1, for example. Load balancers 114 (not shown in FIG. 9A) associated with each cluster in clouds 906-910 provide access to local agents within that cloud. The clouds 904-910 are associated with respective discovery priorities 1-4, meaning that agents in enterprise branch 904 have a higher discovery priority than the agents hosted in enterprise campus 906, and so on down the line. Using load balancers 114, if an agent cluster in any of clouds 906-910 runs out of agent capacity, that cluster will generate a STUN error; when used with ICE, this means the caller 108 will connect to the highest priority cluster with available capacity. In an embodiment, agents 106 in enterprise campus 906 or enterprise branch 904 are used only by clients 108 that are connected to an enterprise network. At each of the discovery priority levels, a nearest agent 106 can be discovered by a Geo-DNS lookup. An anycast IP address may be preferred for enterprise branch 904.

Figure 9B:
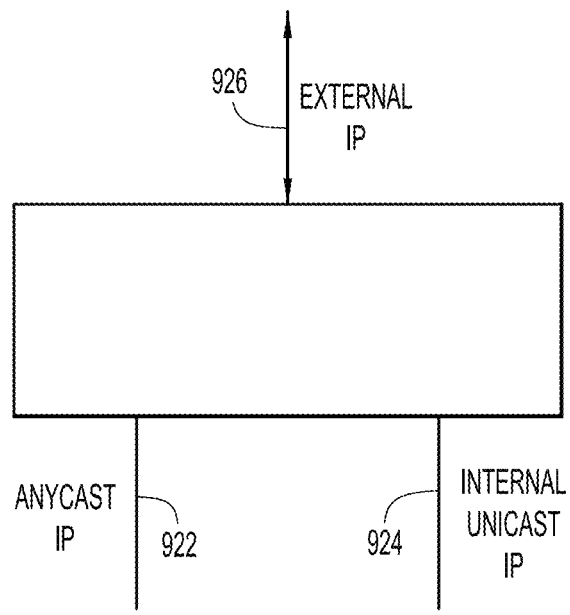
FIG. 9B is a block diagram of an example standalone media agent deployed in either of enterprise branch or an enterprise campus, according to an example embodiment.

With reference to FIG. 9B, there is a block diagram of an example standalone media agent 920 deployed in either of enterprise branch 904 or enterprise campus 906. Media agent 920 corresponds to any of agents 600 deployed in a standalone configuration that does not include multiple agents 106 and does not include a load balancer. Standalone agent 920 within enterprise cloud 904 or 906 has three IP interfaces, including an anycast IP interface 922 and an internal unicast IP interface 924 used by callers, and an external IP interface 926 that is public facing. External IP interface 926 operates on a known media port and is reachable from the public Internet. External IP interface 926 is used when agent 920 connects to other agents for cascaded media and to controller 102. Thus, external IP interface 926 is used for, e.g., HTTP-based communications with controller 102 (not shown in FIG. 9B), and RTP/STUN with other agents. The IP address of interface 926 should be pinholed in a firewall. A simplified deployment model is one in which external IP interface 926 does not have an inbound pinhole enabled; in that case the agent can only cascade with other public facing agent, or it can utilize ICE techniques interagent.

Agents include "full" agents that implement a bi-directional external IP interface 926. Agents may also include "outbound" agents that implement only an out-bound external interface. In the outbound case, agent uses the external IP interface for outbound HTTP transactions with controller 102 and outbound RTP/STUN transactions with other full agents. When controller 102 orchestrates a media cascade between agents, and one of the agents is outbound only, that agent is connected to a full agent. The outbound agent will send RTP messages to the full agent, but will begin such transactions with a STUN connectivity check (to prime any firewalls), then send the RTP messages. This outbound STUN+RTP opens a communication pinhole for receiving reverse RTP. Alternatively, the "outbound" agents may utilize full ICE in order to connect to each other even though both are behind firewalls. This enables a simplified configuration in the corporate firewall to allow outbound UDP (and reverse) from the known port and from the set of known agent IP addresses, which avoids the need for a demilitarized zone (DMZ) box.

Figure 9C:
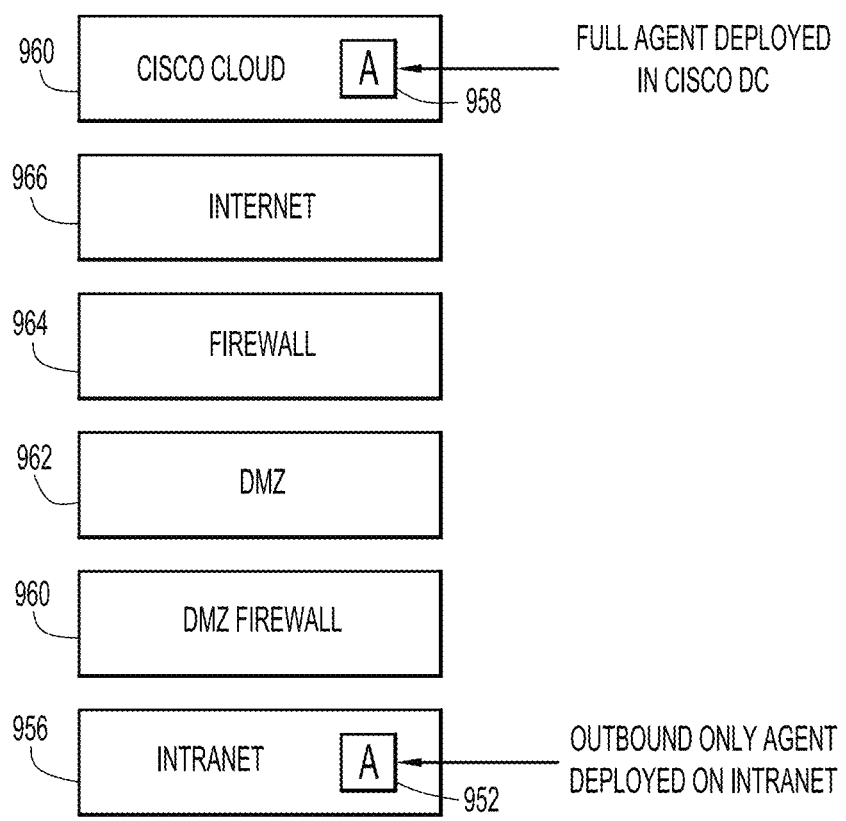
FIG. 9C is an illustration of a corporate configuration in which a communication pinhole is opened between full and outbound media agents, according to an example embodiment.

With reference to FIG. 9C, there is an illustration of a corporate configuration 950 in which the above-mentioned communication pinhole is opened. An outbound agent 952 resides in an Intranet 956 and a full agent 958 resides in a "Cisco" cloud 960. Outbound agent 952 sends messages to full agent 958 in an outbound direction through a DMZ firewall 960, a DMZ 962, a firewall 964, and the Internet 966. Alternatively, in the same configuration, two outbound agents can communicate with each other, utilize full ICE between them in order to open communication pinholes in both firewalls.

Figure 10:
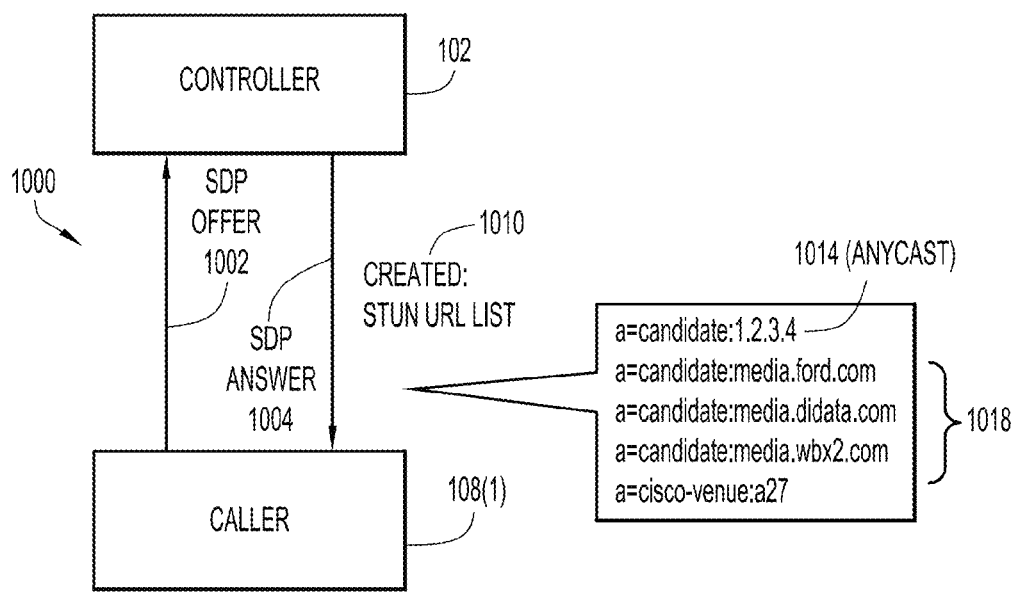
FIG. 10 is an example transaction diagram directed to discovery of an agent in the clouds/networks of FIG. 9 by a caller, according to an example embodiment.

With reference to FIG. 10, there is depicted call setup transactions 1000 between controller 102 and caller 108(1), leading to discovery of an available agent in clouds 904-910 that is nearest to the caller. The transactions include an SDP offer 1002 from caller 108(1) to controller 102 and an SDP answer 1004 returned from the controller 102. SDP answer 1004 includes a STUN URL list 1010. STUN URL list 1010 lists in an order of priority from top to bottom STUN URLs for candidate agents (or agent clusters) "a= . . . ." The STUN URLs can include an "anycast" address 1014 "1.2.3.4" for load balancers in enterprise branch 910, and domain names 1018. Caller 108 discovers an available agent starting with the highest priority STUN URL (anycast address 1014) and moving down the list.

Figure 11:
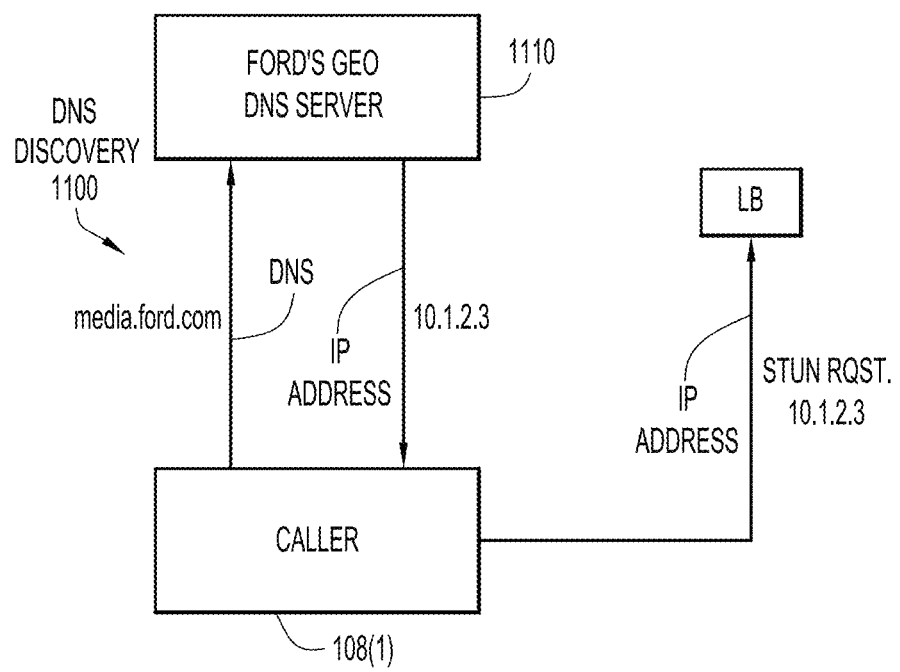
FIG. 11 is an example transactions diagram directed to caller discovery of an agent using a Geo-Domain Name System (DNS) discovery technique, according to an example embodiment.

With reference to FIG. 11, there are depicted transactions 1100 for discovery of an agent using Geo-DNS based on a DNS name. Typically, but not necessarily, a DNS name may be used for agent clusters hosted in partner clouds 908 and the Cisco cloud (e.g., WebEx) 910. In the example of FIG. 11, to initiate agent discovery, caller 108(1) sends the domain name media.ford.com to a Geo-DNS server 1110 for Ford. Ford's DNS server 1110 uses Geo-DNS techniques to return an IP address (e.g., "10.1.2.3") of a closest agent cluster to caller 108(1). Typically, the IP address returned to caller 108(1) represents a virtual IP address of a load balancer 114(1) of the closest agent cluster. Also, the DNS lookup may produce an anycast IP address, or a private address in the case of a corporate DNS. Alternatively, if the load balancer function is integrated into the nodes in the cluster, the DNS lookup may return a random node in the cluster. If caller 108(1) is on enterprise campus 906, corporate DNS names will be resolvable and produce a corporate internal virtual IP address or IP address of one of the nodes in the cluster. Caller 108(1) sends the STUN request to load balancer 114(1) identified by the returned (discovered IP address) (see, e.g., STUN request transaction 404 in FIG. 4).

Figure 12A:
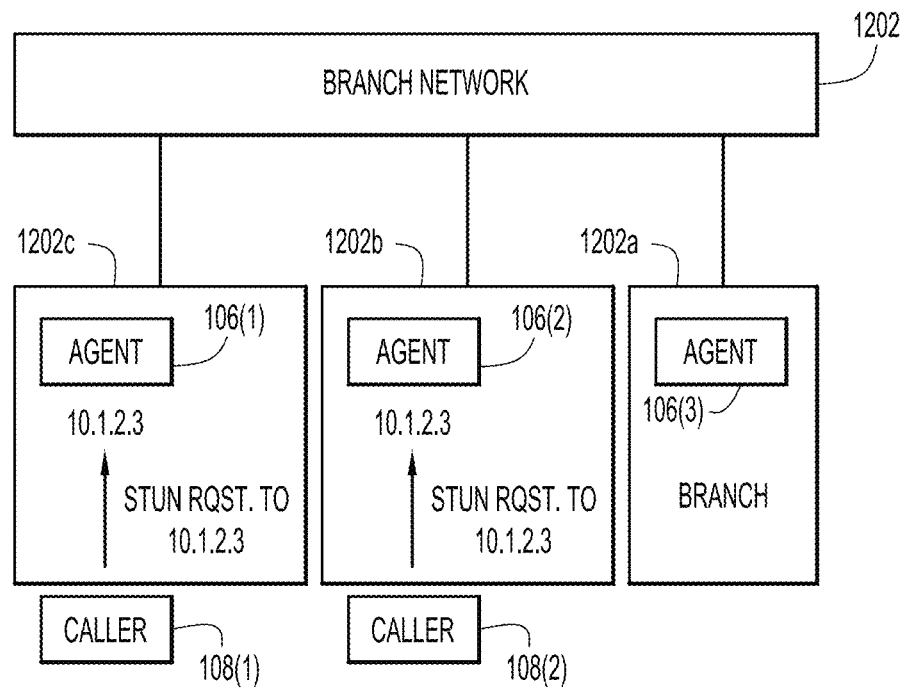
FIG. 12A is an illustration of branch discovery by a caller using an anycast address in a branch network, according to an example embodiment.

With reference to FIG. 12A, there is an illustration of branch discovery 1200 using an anycast address in a branch network 1202 including three branches 1202a, 1202b, and 1202c. Respective individual agents 106(1)-106(3) in each of branches 1202a-1202c share the same anycast address "10.1.2.3." When caller 108(1) sends respective STUN requests to the anycast address "10.1.2.3," the STUN request will be routed to one of agents in the branch that is nearest to the caller. In a deployment of only one agent per branch with no load balancer, the STUN request routes directly to the one agent. Anycast discovery offers certain advantages, for example, anycast discovery may be provide better discovery than GeoDNS for fine grained, localized discovery. Anycast discovery is configuration-free. Anycast works with UDP based services and is ideal for STUN. With anycast, agents maybe highly compartmentalized, enabling highly localized connectivity that would be difficult for GeoDNS to achieve.

Figure 12B:
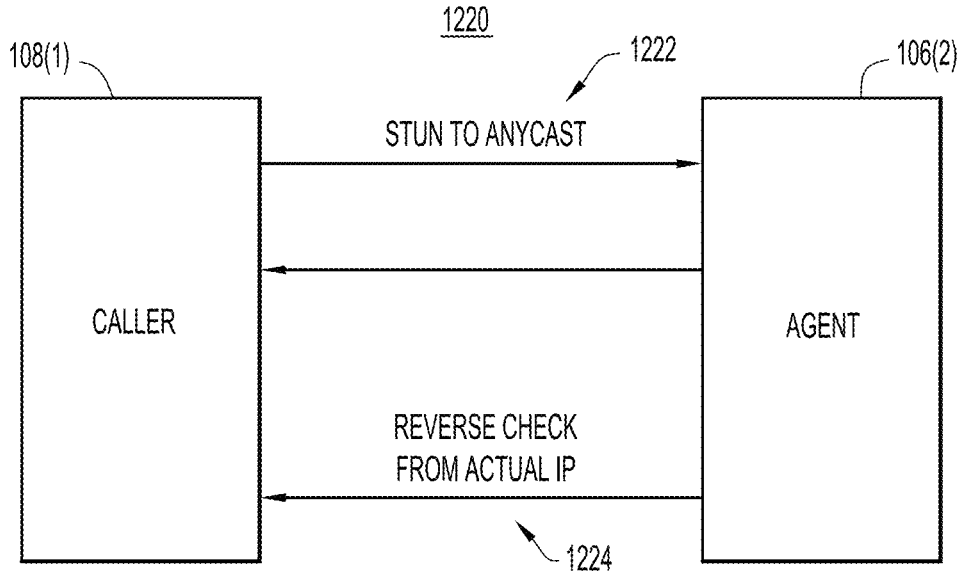
FIG. 12B are depicted transactions between a caller and a media agent used to lock down anycast IP addresses, according to one embodiment.

With reference to FIG. 12B, there are depicted transactions 1220 between caller 108(1) and agent 106(2) used to lock down anycast IP addresses, according to one embodiment. Because an RTP message sent to an anycast address may be routed to different agents 106. Transaction 1222 is a STUN transaction from caller 108(1) to agent 106(2). This initiates a lock down of the destination IP address to that agent. Using ICE, agent 106(2) generates a reverse connectivity check transaction 1224 that is sent from the actual IP address of the agent. This will appear to caller 108(1) as a new peer reflexive IP address, and the caller will proceed to perform a check with it and use it as a higher priority.

Figure 12C:
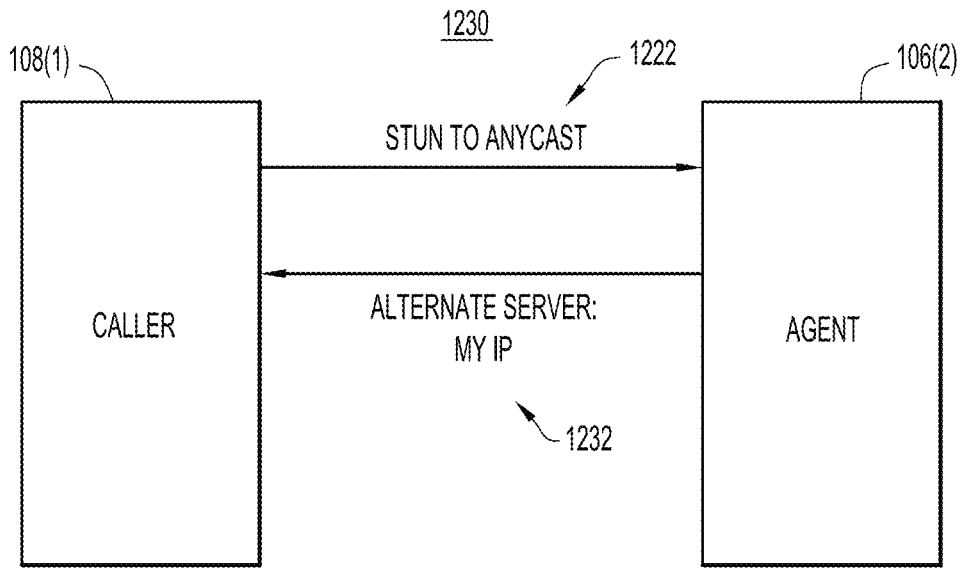
FIG. 12C are depicted transactions between a caller and a media agent used to lock down anycast IP addresses, according to another embodiment.

With reference to FIG. 12C, there are depicted example transactions 1220 between caller 108(1) and agent 106(2) used to lock down anycast IP addresses, according to another embodiment. Transactions 1220 lock down the IP address of agent 106(2) using a STUN redirect 1232 that includes an ALTERNATE-SERVER attribute that points to the actual IP of the agent itself.

In another alternative embodiment, the locked down IP address can be provided through an out-of-band protocol, such as a data channel protocol.

Generation of STUN URL

Figure 13:
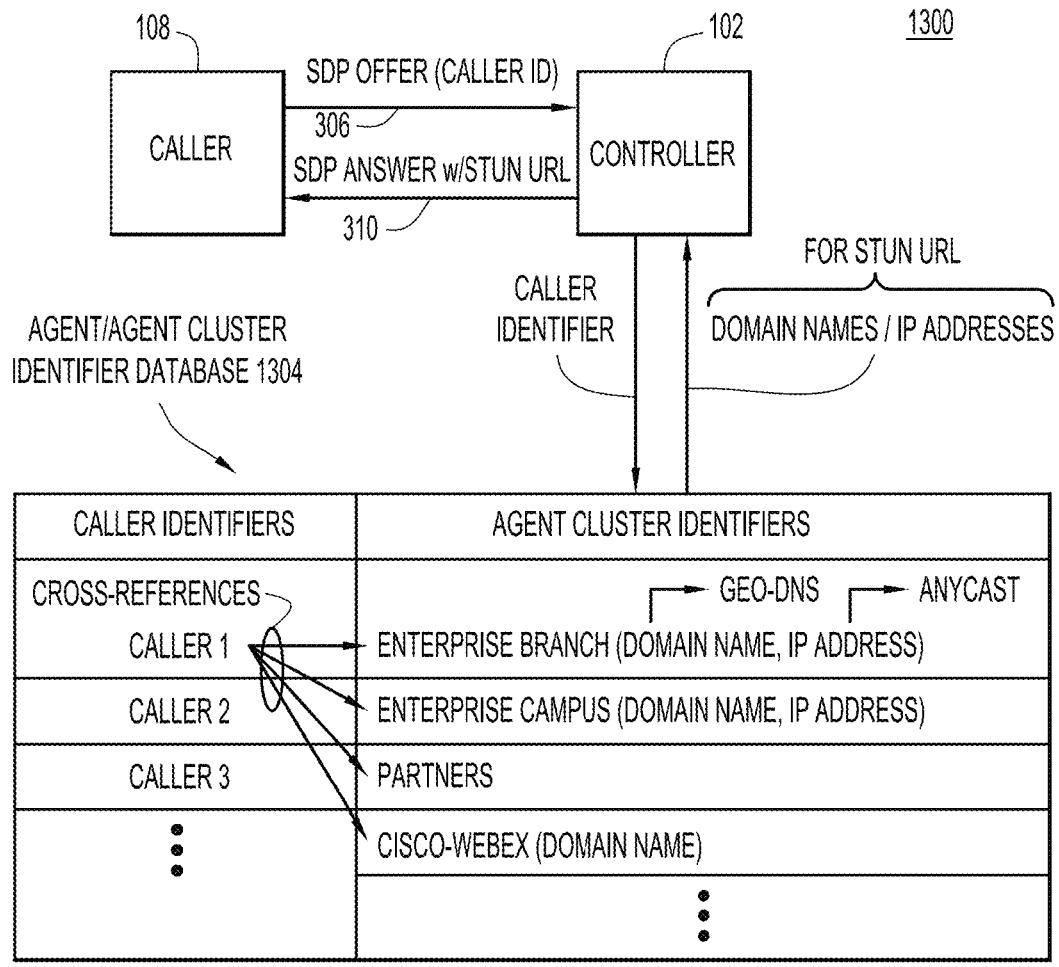
FIG. 13 is an illustration of resources used by the central conference controller to generate a Session Traversal Utilities for Network Address Translation/Translator (NAT) (STUN) Uniform Resource Locator (URL) in response to a Session Description Protocol (SDP) offer from a caller used to initially access a conference session, according to an example embodiment.

With reference to FIG. 13, there is an illustration of resources 1300 used by controller 102 to generate a STUN URL in response to an SDP offer from a caller, e.g., caller 108(1). Drawing from examples described above, caller1 sends an SDP offer at transaction 306 (FIG. 3) to initiate access to a conference session. The SDP Offer includes an authorization token that carries, e.g., caller1 ID(s), such as a device address, a user name, and so on, that controller 102 uses to identify and authorize the caller. Typically this token is carried in the HTTP request and not in the SDP per se.

Controller 102 authenticates caller1 based on the caller1 ID(s) in the SDP offer based on authentication databases (not shown in FIG. 13) accessible to the controller.

Controller 102 has access to a variety of databases including an Agent/Agent Cluster Identifier database 1304 that stores a cross-reference between caller IDs 1306 and agent/agent cluster domain names/(Unicast) IP addresses 1308 (corresponding to clusters of agents, e.g., load balancers, as well as agents without load balancers). Generally, database 1304 reflects the various domain names and/or IP unicast addresses to which the various load balancers and agents are registered and cross-references those domains/addresses to caller IDs.

The entries in database 1304 may be pre-provisioned. For example, controller 102 may provide an administrative portal through which an administrator may pre-provision database 1304, e.g., enter the domain names and IP addresses for load balancers in agent clusters and agents without clusters, and associate that information with caller IDs. Alternatively, the entries of database 1304 may be generated automatically using automated discovery and configuration techniques.

Construction of database 1304 may rely on the following provisioning relationships. Every caller 108 is associated with zero or one enterprises. This is zero for over the top callers 108, and one for callers that are paid for by an associated enterprise. Every caller is associated with zero or one partners. This is zero for over the top callers 108, or enterprise callers that e.g., Cisco, sells to directly. It is one for partner provided enterprises. For example, if Dimension Data is hosting agents 106 and resells to Ford, for a Ford caller, Dimension Data is their partner. If e.g., Cisco, has co-location deals where agents 106 are placed in partner data centers which are usable by any caller 108, such data centers are considered Cisco data centers. An enterprise can optionally deploy agents 106 at the campus level, branch level, or both. Through the administrative portal, the administrator provisions a single IP address or domain name for branch, and a single IP address or domain name for campus. For IP addresses—these may be IP anycast addresses that the administrator configures to route to one of agents 106. For DNS names, these may be GeoDNS capable, and the administrator may set up GeoDNS resolution within their enterprise DNS. The administrator makes entries into database 1304 in accordance with such relationships.

Controller 102 accesses agent cluster IDs (e.g., domain names and IP addresses) relevant to caller1 based on the authenticated ID of caller1. For example, controller 102 may use the caller1 ID as an index to the relevant agent cluster IDs. In an embodiment, there will be a single DNS name for all of, e.g., Cisco's agent clusters, and GeoDNS will be used to resolve the DNS name to a nearby cluster. If the caller is an enterprise user, the partner, campus, and/or branch DNS/IP are obtained. These may have all been provisioned by the administrator, as mentioned above.

Controller 102 retrieves the accessed agent cluster IDs and generates the STUN URL(s), i.e., one URL or a URL list, with the retrieved information. In the example of FIG. 13, the retrieved URL list matches URL list 1010 depicted in FIG. 10 based on the entries in database 1304.

Controller 102 sends the SDP answer, including the retrieved STUN URL(s), to caller1 at 310.

STUN Load Balancer Operation

Figure 14:
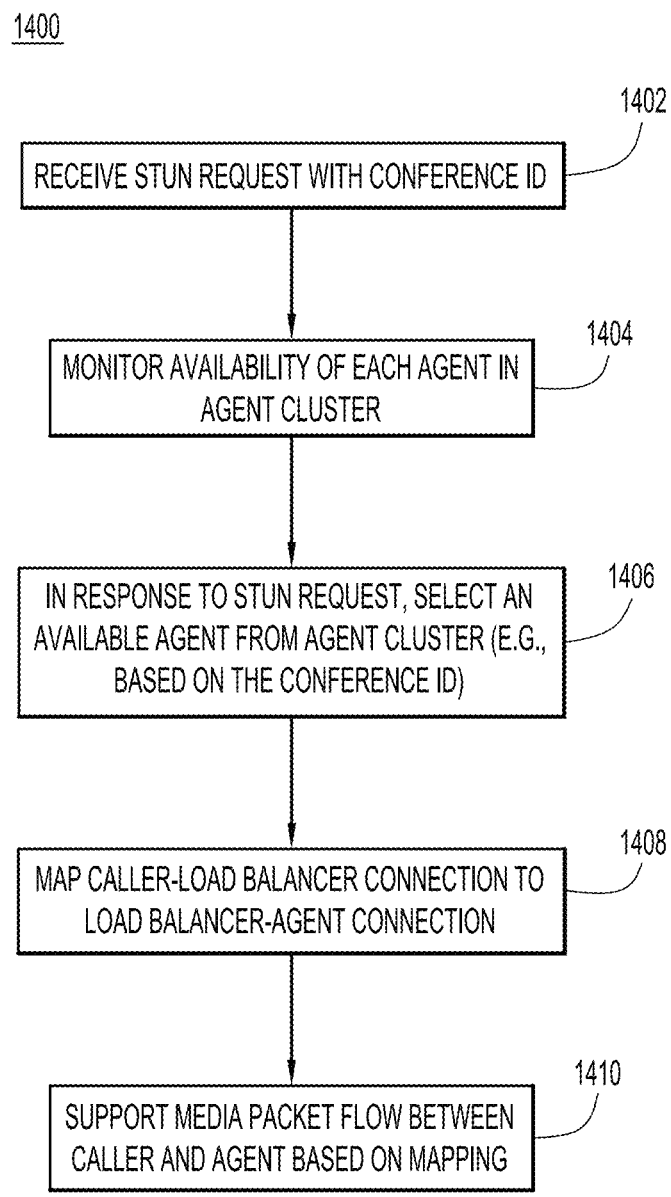
FIG. 14 is a flowchart of an example method of controlling media agents in a media agent cluster that is performed by a load balancer, according to an example embodiment.

As mentioned above, each agent cluster includes one or more load balancers to control agents local to that cluster. With reference to FIG. 14, there is depicted a flowchart of an example method 1400 of load balancing across agents in a cluster. This method is performed by the load balancer for that cluster. Operations of method 1400 correspond with transactions 406 and 506 described above in connection with FIGS. 4 and 5.

At 1402, a load balancer receives a STUN request from one of callers, e.g., caller1.

At 1404, the load balancer monitors/determines an availability of each agent in the local cluster. The load balancer may determine an up/down status (i.e., operational/failure status) of each of agents. In addition, the load balancer may determine a processor loading/processing bandwidth for each agent. Other indicators/factors of availability may be monitored by the load balancer.

At 1404, the load balancer determines/selects one of agents to process the STUN request for the caller based on the determined agent availabilities, e.g., the load balancer selects from among the agents that are determined to be operational. The select operation is made to be "sticky," meaning that in most, but necessarily all, circumstances, the load balancer selects the same available agent for all STUN requests that include the same conference ID. The above-mentioned "stickiness" represents a logical binding between the conference ID and the selected agent that will generally (i.e., in most circumstances) lead to that agent being selected for different callers accessing the same conference session (i.e., using the same conference ID); however, the binding is weak enough to allow selection of different agents for the same conference ID in cases where that agent is not available due to, for example, insufficient processor bandwidth or failure of the agent, as described below.

To this end, the load balancer may perform a consistency hash over the conference ID included in the STUN request modulus a number of agents in the cluster, so that the hash result is constrained to that number of agents. For example, assuming 15 agents in a cluster, the consistency hash will hash the conference ID to a whole number between 1 and 15, inclusive, or, more generally, to 1 of 15 IDs for respective ones of the 15 agents. The consistency hash hashes the same conference ID to the same result to achieve "stickiness," so that the load balancer will select the same agent for multiple callers that have sent the same STUN URL conference ID to join/access the same conference. On the other hand, the consistency hash hashes different conference IDs to different hash results, so the hash will select different agents across different conference IDs. Thus, in this embodiment, in general, the load balancer selects a media agent that is determined to be operational and utilizing a consistent hash of the conference ID to the set of available media agents.

In another embodiment, the load balancer randomly selects or uses a round-robin technique to select an agent for a given conference ID and stores a mapping between that conference ID and the selected agent. Each time another STUN requests arrives with the same conference ID, the load balancer selects the same agent based on the stored mapping.

In yet another embodiment, the load balancer monitors/determines the processor loading of each agent. If the load balancer detects that the processor loading of a given agent exceeds a high threshold, the load balancer flags that agent as being unavailable. The load balancer selects a next agent instead of the flagged agent to handle subsequent STUN requests. Processor loading may be determined as a percentage of a total processing bandwidth that is currently utilized or, alternatively, a percentage of the total processing bandwidth that is currently not utilized (and thus available).

In other embodiment, if the load balancer detects that all of the available agents in a given cluster have exceeded the high threshold, the load balancer may activate or "spin-up" new virtual machines to be used as additional agents in order to add processing capacity to that cluster. Similarly, if the load balancer detects that the processor loading of a given agent falls below a low threshold, the load balancer may deactivate that agent to conserve resources.

In another embodiment, the load balancer tracks the available CPU capacity of each of the nodes in the cluster. It furthermore maintains a database—which can be a distributed database using DHT techniques for example—and stores a mapping of venues to media agents. When a STUN request arrives, the load balancer checks to see if the venue is already assigned to a media agent. If it is, the load balancer redirects the client to that media agent. If it is a new venue, the load balancer selects the most lightly loaded media agent, stores the association of venue to that media agent, and redirects the client to that media agent.

Combinations of two or more the above techniques may be used in the selection process.

After the load balancer has selected an available agent, there are two logical connections in play that are known to the load balancer, including (i) a first logical connection between the caller and the load balancer represented as a first 5-tuple including a Source IP address (caller), Source Port (caller), destination IP address (load balancer), destination port (load balancer), and (ii) a second logical connection between the load balancer and the selected agent represented as a second 5-tuple including a Source IP address (load balancer), Source Port (load balancer), destination IP address (agent), destination port (agent). The 5-tuple may also include a protocol descriptor.

At 1406, the load balancer associates the first and second logical connections to each other. For example, the load balancer stores a mapping between the two logical connections, such as a mapping between the first and second 5-tuples. That way, when the load balancer receives a media packet from the caller over the first connection, the load balancer knows to forward/route the packet to the selected agent based on the association/mapping between the first and second connections, and vice versa.

At 1408, the load balancer supports media packet flow between the caller and the selected agent based on the stored connection mapping between the first and second connections. In an embodiment in which the media packets are RTP packets, the packets do not contain the conference ID. Thus, the load balancer relies on the connection mapping to perform the correct bidirectional routing/forwarding of the media packets between the caller and the agent.

At 1410, if the load balancer detects that the selected agent is no longer available, e.g., the agent has failed, the load balancer rapidly selects a different available agent, constructs and stores the appropriate connection mapping, and then supports media flow between the caller and the new agent.

Alternatively, the client may detect a loss in received media packets over a short period of time and construe the loss as an agent failure. This prompts the caller to resend the STUN request to the load balancer. In the meantime, the load balancer may have also detected the failure. As a result, the load balancer selects a different agent to handle the call and stores the appropriate connection mappings.

Figure 15:
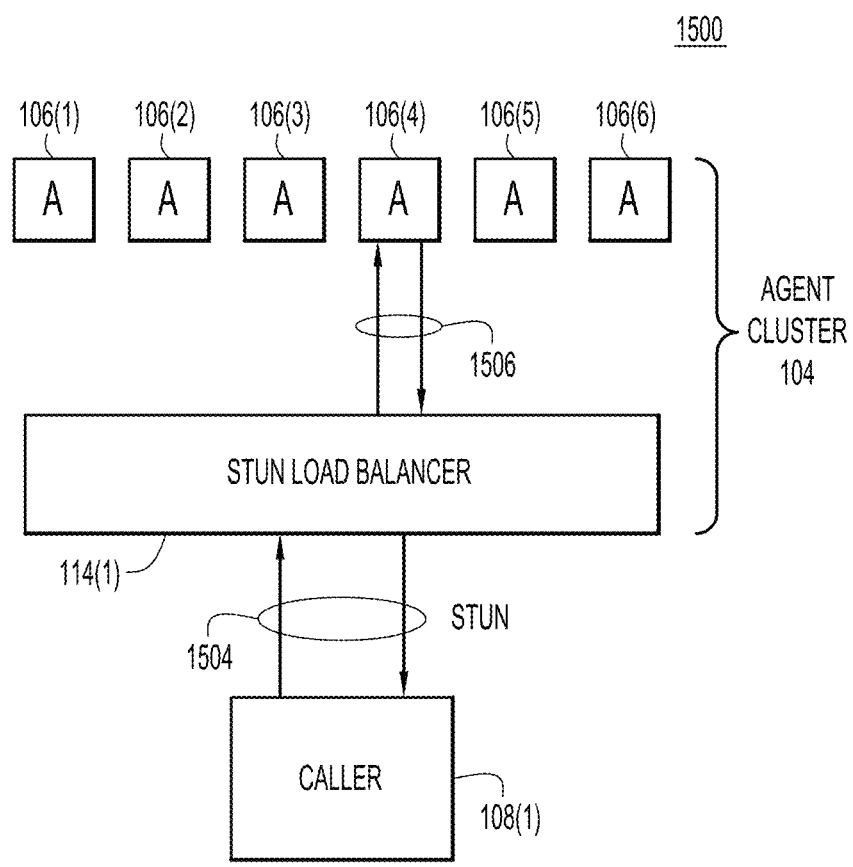
FIG. 15 is an illustration of an example caller-agent connection that results from the method of FIG. 14, according to an example embodiment.

With reference to FIG. 15, there is depicted an illustration of an example caller-agent connection 1500 that results from performing method 1400 and in which a load balancer acts as an intermediary. In the example of FIG. 15, load balancer 114(1) has selected agent 106(4) from among the 6 agents 106(1)-106(7) in an arbitrary cluster 104 based on the conference ID, and has formed first and second logical connections 1504 and 1506 over which media packets may flow bi-directionally between the caller and the agent.

Figure 16:
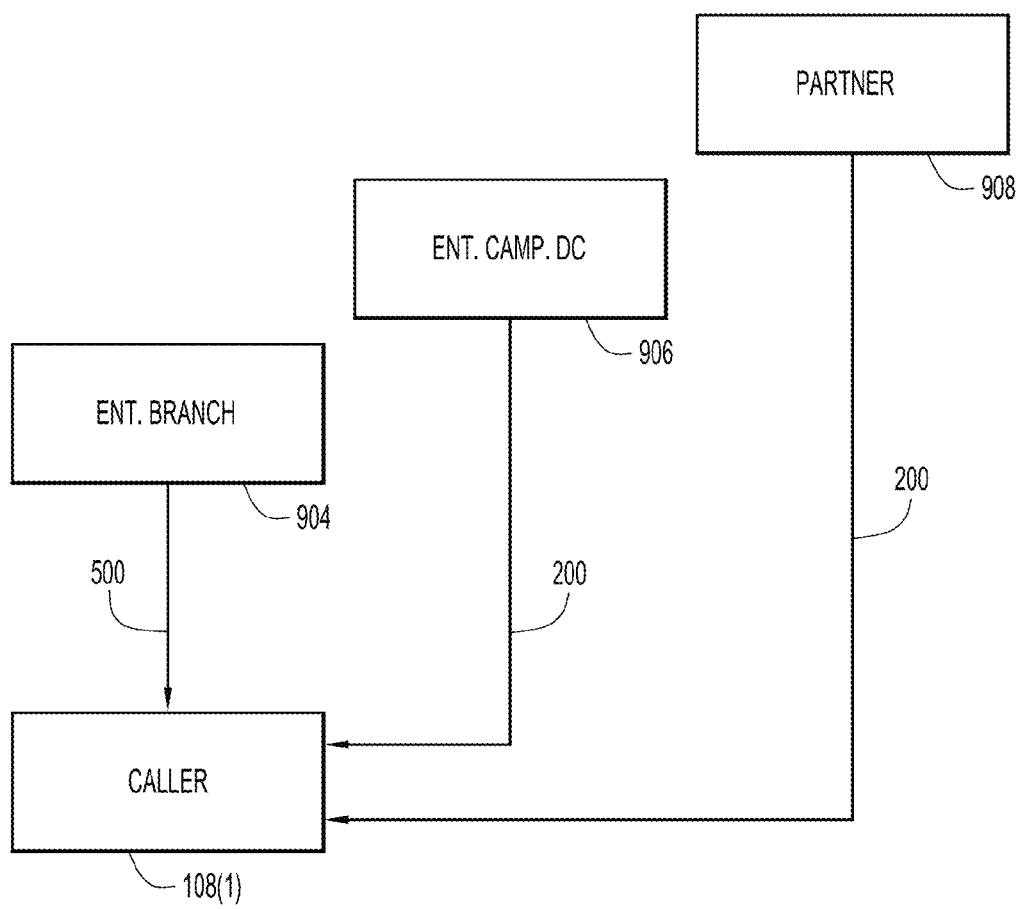
FIG. 16 is an illustration of global capacity handling—load balancing in the deployment model of FIG. 9A with high-call numbers, according to an example embodiment.

With reference to FIG. 16, there is an illustration of global capacity handling 1600 that involves load balancing in deployment model 900 with relatively high call numbers. Due to the presence of load balancers, there is no need for a centralized awareness of overall resource availability, i.e., controller 102 does not need to be aware of, or track, the processor availability or utilization curves of individual agents distributed across clouds 904-910. The load balancer for each agent cluster in each of clouds 904-910 monitors agent processor availability/capacity and performs load balancing of the agent cluster in that cloud. As long as a given agent cluster has available processing bandwidth, the local load balancer for that cluster sends a "200." When the local cluster has hit capacity, the load balancer 114 rejects STUN requests with a "500." The "200" and "500" represent response codes and, as such, these are messages sent from the load balancer back towards the caller/client. When used in concert with ICE, this will result in the client getting connected to the nearest cluster that has available capacity, which is the desired result.

SUMMARY

Techniques Presented Herein Dynamically Configure Resources in a Highly-Distribute cloud-based conference system in connection with a conference session. Centralized controllers are located in the cloud. Media agents are geographically distributed in massive scale (on the order of tens of thousands) around the world so as to be located topologically near to callers/clients (i.e., users). A conference session access/join process uses media path signaling, e.g., STUN, as part of ICE to connect a caller to a nearby media agent using any of a number of different discovery techniques, including, but not limited to, anycast, split-horizon DNS, and the like. Once the callers discover and connect to respective agents for the conference session, the agents discover and contact the conference controller. In response, the conference controller configures the agents into a media topology for the conference session. Failover is accomplished by having the client rapidly detect failure and repeat a STUN peer-to-peer transaction to connect to a new agent.

As a result, callers at various locations can easily join and leave a conference session. The centralized controller can configure/reconfigure the utilized media agents to begin or end communication with other media agents to facilitate conference session changes and/or network changes. This results in optimal topologies as illustrated by the following examples. If a conference session is between callers in the same company foo.com, and foo.com has a media agent deployed in its data centers, the media will be directed from each caller to the agent in the company's data centers—similar to a typical premise-based conference session. If a conference is between callers in the same company but that company does not have a local media agent, the media will be directed from each caller to the nearest cloud, as in a WebEx conference session. If a conference is between callers in two different companies, and both companies have an on-premise media agent, the callers in company A are all connected to the agent in company A. The callers in company B are all connected to the agent in company B, and between them flows switched media with (for example) the audio and video of the top three active participants (speakers). This type of topology is currently not available with conventional conference systems. An advantage is that it uses minimal WAN bandwidth.

Thus, the techniques dynamically configure media topologies and effectively emulate topologies of pure cloud products, pure premise products, interexchange services, remote dial-ins, and so on—all within a singular system architecture. Advantages of such techniques include: large scale distribution of media agents with a centralized controller; an efficient and straight-forward conference session joining process which uses media-path discovery to connect a caller to a nearby agent; a late binding control process by which the topology of media distribution is modified by the conference controller on-demand as callers are connected or reconnected to nearby agents; and rapid failover and recovery, that uses the same topology configuration process as is used to initially establish a conference session, to have a client failover to a new media agent if the previous agent fails (or cannot be reached). Even further, the techniques retain all of the benefits of centralized conference sessions in the cloud—single conference URL, single roster, single SIP signaling ports, singe conference control functions, yet media is distributed locally for optimal usage of a wide area network (WAN) connection; applicable to use cases with a singular architecture (described above) that are currently using disparate systems; and create a conferencing service that easily scales upward while maintaining high quality.

Other techniques presented herein perform load balancing across a cluster of media agents in connection with a conference session. Load balancing of conference sessions is performed at the media layer using a STUN load balancer, which directs STUN transactions (and messages) to an available back-end media agent. The STUN messages include a conference ID, which the load balancer can use as input to a consistent hash, to route callers for the same conference session to the same media agent. The load balancer can monitor processor usage of the media agents to direct load balancing and/or spin up/down virtual machine instances. The load balancing techniques advantageously allow for media plane discovery in a centralized conference architecture with distributed media; provide HTTP load balancing techniques at the media layer, and are amenable to elastic expansion/contraction of media agent/server capacity; allow for localized load balancing control, while still retaining centralized conference state; and allow routers/switches to inspect STUN messages and obtain information therein as a result of the embedded conference ID in the STUN messages.

In summary, in one form, a method is provided comprising: at a load balancer configured to control a cluster of media agents each configured to perform media packet processing operations in a conference session: receiving a Session Traversal Utilities for Network Address Translation/Translator (NAT) (STUN) request from a caller to establish media, the STUN request including a conference identifier (ID) for the session; determining an availability of each of the media agents in the cluster; selecting a media agent for the caller based on the conference ID and the determined media agent availabilities; forwarding the STUN request to the selected media agent; and routing media packets between the caller and the selected agent for the session.

In summary, in another form, an apparatus is provided comprising: an interface unit configured to enable communications with a cluster of media agents each configured to perform media packet processing operations in a conference session; and a processor coupled to the interface unit, and configured to: receive a Session Traversal Utilities for Network Address Translation/Translator (NAT) (STUN) request from a caller to establish media, the STUN request including a conference identifier (ID) for the session; determine an availability of each of the media agents in the cluster; select a media agent for the caller based on the conference ID and the determined media agent availabilities; forward the STUN request to the selected media agent; and route media packets between the caller and the selected agent for the session.

In summary, in yet another form, a processor readable medium is provided. The processor readable medium stores instructions that, when executed by a processor, cause the processor to: at a load balancer configured to control a cluster of media agents each configured to perform media packet processing operations in a conference session, receive a Session Traversal Utilities for Network Address Translation/Translator (NAT) (STUN) request from a caller to establish media, the STUN request including a conference identifier (ID) for the session; determine an availability of each of the media agents in the cluster; select a media agent for the caller based on the conference ID and the determined media agent availabilities; forward the STUN request to the selected media agent; and route media packets between the caller and the selected agent for the session.

The above description is intended by way of example only. Various modifications and structural changes may be made therein without departing from the scope of the concepts described herein and within the scope and range of equivalents of the claims.

What is claimed is:

1. A method comprising:
   at a load balancer configured to control a cluster of media agents each configured to perform media packet processing operations in a conference session:
   receiving a Session Traversal Utilities for Network Address Translation/Translator (NAT) (STUN) request from a caller to establish media, the STUN request including a conference identifier (ID) for the conference session;
   determining an availability of each of the media agents in the cluster;
   selecting a media agent for the caller based on the conference ID and the determined media agent availabilities;
   forwarding the STUN request to the selected media agent; and
   routing media packets between the caller and the selected media agent for the conference session.

2. The method of claim 1, wherein the STUN request is received from the caller over a first logical connection between the caller and the load balancer,
   the STUN request is forwarded to the selected media agent over a second logical connection between the load balancer and the selected media agent; and
   the method further comprises:
   storing a connection mapping of the first logical connection to the second logical connection, wherein the routing includes routing the media packets between the caller and the selected media agent over the first and second logical connections based on the stored connection mapping.

3. The method of claim 2, further comprising generating the connection mapping as a mapping between first and second 5-tuples respectively identifying the first and second logical connections, wherein each 5-tuple includes a source Internet Protocol (IP) address, a source port, a destination IP address, a destination port, and a protocol.

4. The method of claim 1, wherein:
   the determining includes determining for each media agent an operational/failure status and a processor loading of the media agent; and the selecting includes selecting a media agent that is determined to be operational and utilizing a consistent hash of the conference ID to the set of available media agents.

5. The method of claim 4, further comprising:
activating a new media agent if all existing media agents are each determined to have processor loading above a high threshold; and
deactivating any media agents determined to have processor loading below a low threshold.

6. The method of claim 1, further comprising:
receiving a second STUN request from a second caller to join the conference session, the second STUN request including the conference ID; and
selecting the previously selected media agent for the second caller based on the conference ID.

7. The method of claim 1, wherein:
the receiving includes receiving multiple join requests including respective conference IDs;
the selecting includes:
  selecting a same one of the media agents for each of the multiple join requests if the respective conference IDs are the same; and
  selecting different media agents for each of the multiple join requests if the respective conference IDs are different.

8. The method of claim 1, further comprising:
receiving a second STUN request from the caller to join the conference session, the second STUN request including the conference identifier (ID) for the conference session;
determining that the operational status of the selected media agent is down;
selecting a second media agent for the caller; and
routing media packets between the caller and the second selected media agent for the conference session.

9. The method of claim 1, wherein the STUN request is sent as part of connectivity checks mandated by the Interactive Connectivity Establishment (ICE) protocol (RFC 5245).

10. An apparatus comprising:
an interface unit configured to enable communications with a cluster of media agents each configured to perform media packet processing operations in a conference session; and
a processor coupled to the interface unit, and configured to:
  receive a Session Traversal Utilities for Network Address Translation/Translator (NAT) (STUN) request from a caller to establish media, the STUN request including a conference identifier (ID) for the conference session;
  determine an availability of each of the media agents in the cluster;
  select a media agent for the caller based on the conference ID and the determined media agent availabilities;
  forward the STUN request to the selected media agent; and
  route media packets between the caller and the selected media agent for the conference session.

11. The apparatus of claim 10, wherein
the STUN request is received from the caller over a first logical connection between the caller and the load balancer,
the STUN request is forwarded to the selected media agent over a second logical connection between the load balancer and the selected media agent; and
the processor is further configured to:
store a connection mapping of the first logical connection to the second logical connection, wherein the processor is configured to route by routing media packets between the caller and the selected media agent over the first and second logical connections based on the stored connection mapping.

12. The apparatus of claim 11, wherein the processor is further configured to generate the connection mapping as a mapping between first and second 5-tuples respectively identifying the first and second logical connections, wherein each 5-tuple includes a source Internet Protocol (IP) address, a source port, a destination IP address, a destination port, and a protocol.

13. The apparatus of claim 10, wherein:
the processor is configured to determine by determining for each media agent an operational/failure status and a processor loading of the media agent; and
the processor is configured to select by selecting a media agent that is determined to be operational and utilizing a consistent hash of the conference ID to the set of available media agents.

14. The apparatus of claim 13, wherein the processor is further configured to:
activate a new media agent if all existing media agents are each determined to have processor loading above a high threshold; and
deactivate any media agents determined to have processor loading below a low threshold.

15. The apparatus of claim 10, wherein the processor is further configured to:
receive a second STUN request from a second caller to join the conference session, the second STUN request including the conference ID; and
select the previously selected media agent for the second caller based on the conference ID.

16. The apparatus of claim 10, wherein:
the processor is configured to receive by receiving multiple join requests including respective conference IDs; and
the processor is configured to select by:
  selecting a same one of the media agents for each of the multiple join requests if the respective conference IDs are the same; and
  selecting different media agents for each of the multiple join requests if the respective conference IDs are different.

17. The apparatus of claim 10, wherein the processor is further configured to:
receive a second STUN request from the caller to join the conference session, the second STUN request including the conference identifier (ID) for the conference session;
determine that the operational status of the selected media agent is down;
select a second media agent for the caller; and
route media packets between the caller and the second selected media agent for the conference session.

18. A non-transitory processor readable medium storing instructions that, when executed by a processor, cause the processor to:
at a load balancer configured to control a cluster of media agents each configured to perform media packet processing operations in a conference session, receive a Session Traversal Utilities for Network Address Translation/Translator (NAT) (STUN) request from a caller to establish media, the STUN request including a conference identifier (ID) for the conference session;
determine an availability of each of the media agents in the cluster;
select a media agent for the caller based on the conference ID and the determined media agent availabilities;

forward the STUN request to the selected media agent; and
route media packets between the caller and the selected media agent for the conference session.

19. The non-transitory processor readable medium of claim 18, wherein the STUN request is received from the caller over a first logical connection between the caller and the load balancer,
the STUN request is forwarded to the selected media agent over a second logical connection between the load balancer and the selected media agent; and
the non-transitory processor readable medium further comprising instructions to cause the processor to:
store a connection mapping of the first logical connection to the second logical connection, wherein the instructions include instructions to cause the processor to route media packets between the caller and the selected media agent over the first and second logical connections based on the stored connection mapping.

20. The non-transitory processor readable medium of claim 19, further comprising instructions to cause the processor to generate the connection mapping as a mapping between first and second 5-tuples respectively identifying the first and second logical connections, wherein each 5-tuple includes a source Internet Protocol (IP) address, a source port, a destination IP address, a destination port, and a protocol.

21. The non-transitory processor readable medium of claim 18, wherein the instructions include instructions to cause the processor to:
determine for each media agent an operational/failure status and a processor loading of the media agent; and
select a media agent that is determined to be operational and utilize a consistent hash of the conference ID to the set of available media agents.

22. The non-transitory processor readable medium of claim 21, further comprising instructions to cause the processor to:
activate a new media agent if all existing media agents are each determined to have processor loading above a high threshold; and
deactivate any media agents determined to have processor loading below a low threshold.

23. The non-transitory processor readable medium of claim 18, further comprising instructions to cause the processor to:
receive a second STUN request from a second caller to join the conference session, the second STUN request including the conference ID; and
select the previously selected media agent for the second caller based on the conference ID.

24. The non-transitory processor readable medium of claim 18, wherein the instructions include instructions to cause the processor to:
receive multiple join requests including respective conference IDs;
select a same one of the media agents for each of the multiple join requests if the respective conference IDs are the same; and
select different media agents for each of the multiple join requests if the respective conference IDs are different.

25. The non-transitory processor readable medium of claim 18, further comprising instructions to cause the processor to:
receive a second STUN request from the caller to join the conference session, the second STUN request including the conference identifier (ID) for the conference session;
determine that the operational status of the selected media agent is down;
select a second media agent for the caller; and
route media packets between the caller and the second selected media agent for the conference session.

* * * * *